US008248639B2

(12) United States Patent
Fujita et al.

(10) Patent No.: US 8,248,639 B2
(45) Date of Patent: Aug. 21, 2012

(54) PRINTING SUPPLY INFORMATION OF AN IMAGE FORMING APPARATUS

(75) Inventors: Takeshi Fujita, Tokyo (JP); Yoshiya Inoue, Kanagawa (JP); Toshio Kitazawa, Chilba (JP); Yasuyuki Igarashi, Kanagawa (JP); Yuka Saito, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1222 days.

(21) Appl. No.: 11/843,739

(22) Filed: Aug. 23, 2007

(65) Prior Publication Data

US 2008/0089729 A1 Apr. 17, 2008

(30) Foreign Application Priority Data

Aug. 25, 2006 (JP) ................................ 2006-228956

(51) Int. Cl.
*G06F 3/12* (2006.01)

(52) U.S. Cl. .................... 358/1.15; 358/1.14; 358/1.13; 347/19; 347/86; 347/214

(58) Field of Classification Search ................ 358/1.14, 358/1.15, 1.13; 347/19, 86, 218, 214
See application file for complete search history.

(56) References Cited

U.S. PATENT DOCUMENTS

| | | | | |
|---|---|---|---|---|
| 6,023,593 | A | 2/2000 | Tomidokoro | |
| 2002/0049839 | A1 * | 4/2002 | Miida et al. | 709/224 |
| 2007/0146398 | A1 | 6/2007 | Igarashi | |
| 2007/0166056 | A1 | 7/2007 | Inoue | |
| 2007/0177439 | A1 | 8/2007 | Saito | |

FOREIGN PATENT DOCUMENTS

| | | |
|---|---|---|
| DE | 38 36 890 | 5/1989 |
| EP | 1 206 088 | 5/2001 |
| JP | 07-214874 | 8/1995 |
| JP | 2001-260502 | 9/2001 |
| JP | 2005-205834 | 8/2005 |
| JP | 2005205834 A * | 8/2005 |

OTHER PUBLICATIONS

European Search Report.
Japanese Office Action dated Jan. 25, 2011.

* cited by examiner

*Primary Examiner* — Jacky X Zheng
(74) *Attorney, Agent, or Firm* — Harness, Dickey & Pierce, P.L.C.

(57) ABSTRACT

An apparatus, method, system, computer program and product each capable of storing supply information of a printer supply of an image forming device, and generating a supply information list including the supply information to be printed on a recording sheet according to print settings information.

20 Claims, 21 Drawing Sheets

| #7 | #6 | #5 | #4 | #3 | #2 | #1 | #0 |
|---|---|---|---|---|---|---|---|
| 1 | 1 | 1 | 1 | 1 | 1 | 1 | 1 |
| 0 | 0 | 0 | 0 | 0 | 0 | 1 | 1 |
| 0 | 0 | 0 | 0 | 0 | 0 | 0 | 0 |
| 0 | 0 | 0 | 0 | 0 | 0 | 0 | 0 |

| SUPPLY NAME | REMAINING AMOUNT | PRINT/UNPRINT |
|---|---|---|
| PHOTOCONDUCTOR | NEAR END | PRINT |
| TONER | 50% | PRINT |

PRINTING SUPPLY INFORMATION OF AN IMAGE FORMING APPARATUS

PRIORITY STATEMENT

This patent application is based on and claims priority under 35 U.S.C. §119 to Japanese Patent Application No. 2006-228956, filed on Aug. 25, 2006, in the Japanese Patent Office, the disclosure of which is incorporated herein in its entirety by reference.

BACKGROUND

Recently, an image forming apparatus, such as a printer, copier, etc., may be provided with the function of notifying a user when a supply of the image forming apparatus needs to be replaced, for example, as described in the Japanese Patent Application Publication No. 2001-260502.

However, such notification indicating that the supply needs to be replaced is not necessarily useful to a user who is not in charge of maintaining the image forming apparatus. Especially when the notification is printed on a recording sheet, a current printing job performed by the user may be interrupted due to this notification function. Further, the notification may contain confidential information that should not be disclosed to the general public such that outputting the notification may not be preferable.

On the other hand, an administrator, who may be in charge of maintaining the image forming apparatus, is not always capable of checking a display or an output of the image forming apparatus. Even when the image forming apparatus displays or prints the notification indicating the need for replacement of the supply, it may take time for the administrator to obtain such notification.

SUMMARY

Example embodiments of the present invention include an apparatus, method, system, computer program and product each capable of storing supply information of a printer supply of an image forming device, and generating a supply information list including the supply information to be printed on a recording sheet according to print settings information.

Various settings regarding the supply information list including the appearance, contents, or types of the supply information list, a type of the recording sheet having the supply information, timing for updating the supply information, timing for printing the supply information list, an apparatus for printing the supply information list, or a position or location at which the recording sheet having the supply information list is discharged may be determined according to the print settings information.

Further, in one example, before printing the supply information list, a printing job being currently performed by a user may be interrupted.

Further, in another example, before printing the supply information list, authentication may be performed on the user to determine whether to allow the user to print the supply information list.

In addition to the above-described example embodiments, the present invention may be practices in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
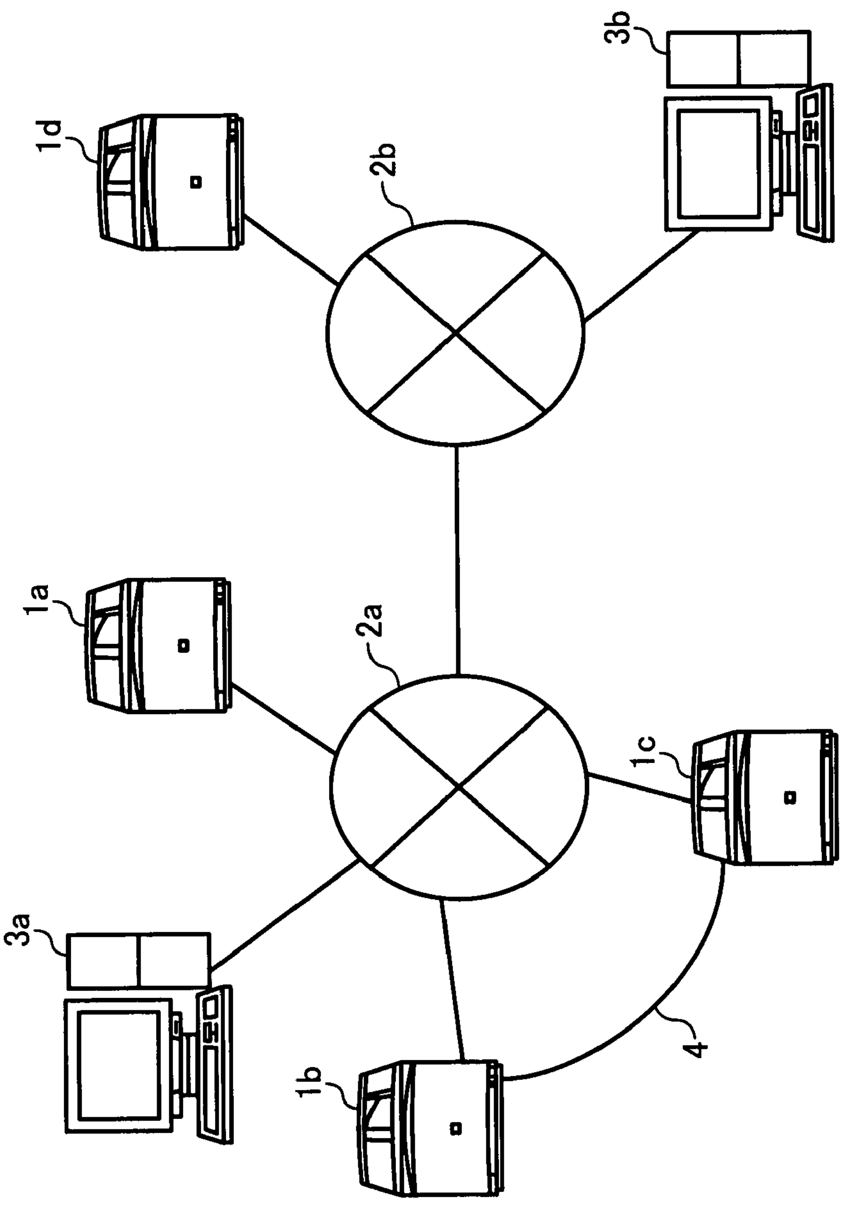
FIG. 1 is a schematic block diagram illustrating the structure of an image forming system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms “a”, “an” and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 2:
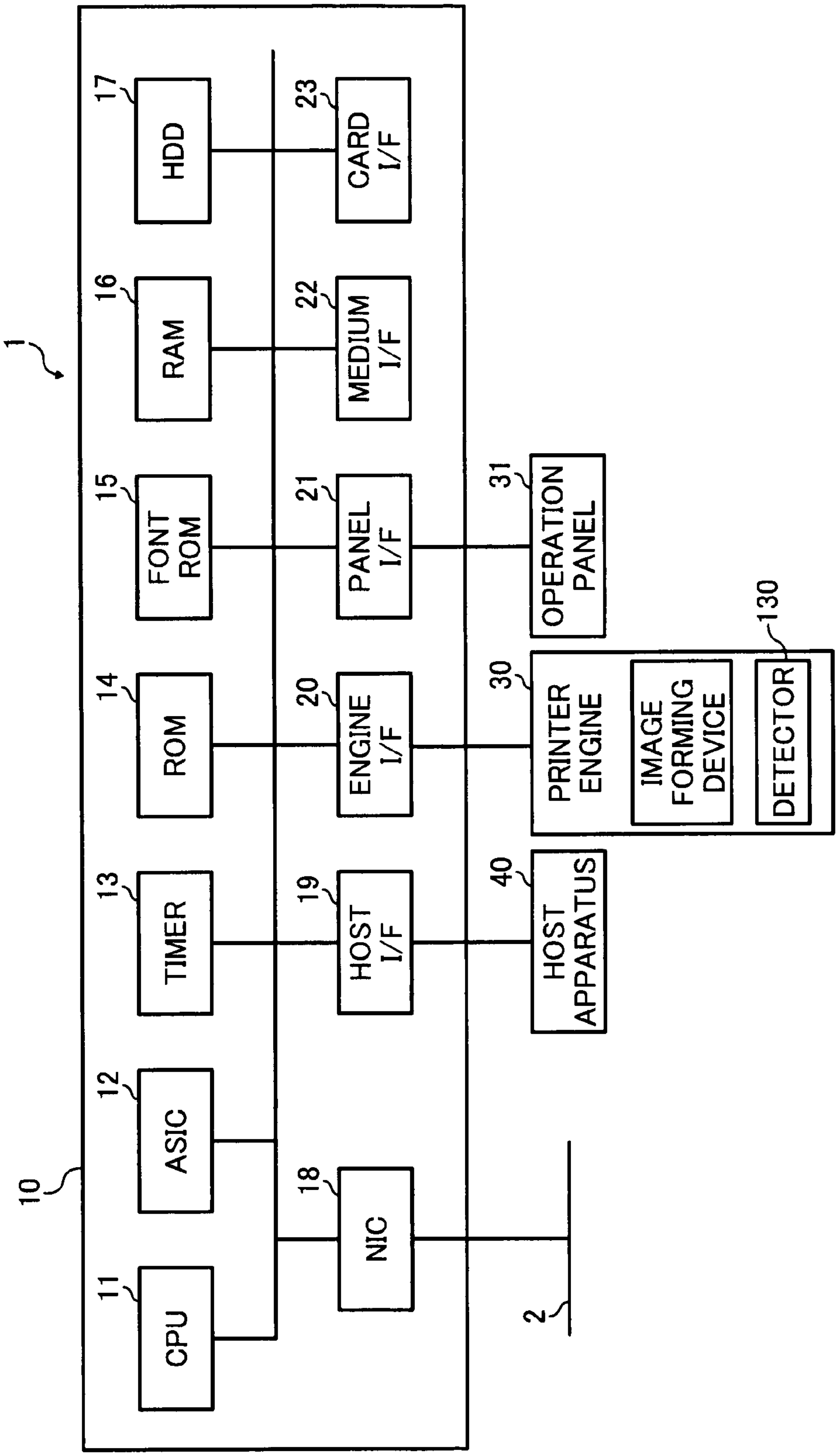
FIG. 2 is a schematic block diagram illustrating the hardware structure of an image forming apparatus according to an example embodiment of the present invention.

Referring now to the drawings, wherein like reference numerals designate identical or corresponding parts throughout the several views, FIG. 1 illustrates an image forming system according to an example embodiment of the present invention. The image forming system of FIG. 1 includes a plurality of image forming apparatuses 1*a*, 1*b*, 1*c*, and 1*d*, which may be collectively referred to as the image forming apparatus 1, and a plurality of computer terminals 3*a* and 3*b*, which may be collectively referred to as the terminal 3. Referring to FIG. 1, the image forming apparatuses 1*a*, 1*b*, and 1*c*, and the terminal 3*a* are connected via a local area network (LAN) 2*a*. The image forming apparatus 1*d* and the terminal 3*d* are connected via a LAN 2*b*. The LAN 2*a* and LAN 2*b*, which may be collectively referred to as the LAN 2, may be connected with each other to create a wide area network (WAN) in which all apparatus shown in FIG. 1 can be communicated. Further, the LAN 2 may be connected to the Internet. In this example, the image forming apparatus 1*b* and the image forming apparatus 1*c* may be directly connected with each other via a communication line 4, which may be in compliance with the IEEE1394 standard. Further, in this example, as illustrated in FIG. 2, the image forming apparatus 1 may be connected to a host apparatus 40 to create a server-client system with the host apparatus 40. The image forming system of FIG. 1 may be implemented in various other ways as long as it includes the image forming apparatus 1 having the function of printing supply information as described below.

The image forming apparatus 1 mainly includes a controller, and a printer engine. For example, the controller converts print data, which may be sent from the terminal 3 or the host apparatus 40, to image data. The printer engine forms a toner image on a recording sheet based on the image data. The terminal 3 or the host apparatus 40 may be implemented by an information processing apparatus, such as a general-purpose computer including a processor, which may be provided with a display device and an input device. Further, the terminal 3 or the host apparatus 40 may be alternatively referred to as a client apparatus or a web client apparatus. In such case, the image forming apparatus 1 may be referred to as a server apparatus or a web server apparatus.

Referring now to FIG. 2, an example hardware structure of the image forming apparatus 1 is explained, when the image forming apparatus 1 is implemented by a printer capable of printing data received from the outside or stored in the image forming apparatus 1. Alternatively, the image forming apparatus 1 may be implemented, for example, as a copier capable of copying an original, or a multifunctional apparatus (MFP) capable of performing one or more functions of scanning, faxing, copying, printing, and communicating via a network, as long as it is capable of printing supply information, such as supply amount information and/or supply status information, as described below. When the image forming apparatus 1 is implemented by a scanner or MFP, other devices, such as a scanner engine, a scanner device, or a document feeder, may be additionally provided. For the descriptive purpose, in this specification, the image forming apparatus 1 may be referred to as the printer 1. Further, the printer 1 may include any desired kind of printer, such as a laser printer or an inkjet printer.

As illustrated in FIG. 2, the printer 1 includes a printer controller 10, a printer engine 30, and an operation panel 31. Further, as described above referring to FIG. 1, the printer 1 may be connected to the LAN 2 and to the host apparatus 40.

The printer controller 10 converts print data, which may be received from the terminal 3 through the network 2 or the host apparatus 40, to image data according to an operation mode, and outputs the image data to the printer engine 30. The operation mode may be set by the printer 1 using a printer driver, which may be installed on the printer 1. Alternatively, the operation mode may be set by the host apparatus 40, the terminal 3, or any other apparatus provided on the network 2, using a printer driver, and sent to the printer controller 10 together with the print data. Still referring to FIG. 1, the printer controller 10 includes a central processing unit (CPU) 11, an application specific integrated circuit (ASIC) 12, a timer 13, a read only memory (ROM) 14, a font ROM 15, a random access memory (RAM) 16, a hard disk drive (HDD) 17, a network interface controller (NIC) 18, a host interface (I/F) 19, an engine I/F 20, a panel I/F 21, a medium I/F 22, and a card I/F 23, which are connected through a bus.

The CPU 11 may control entire operation of the printer 1 according to one or more programs, which may be stored in the ROM 14. For example, upon activation, the CPU 11 reads out an operating system (OS) program from the HDD 17 according to a boot program stored in the ROM 14, loads the OS program onto the RAM 16, and activates the OS program. At the same time, the CPU 11 may load one or more application programs onto the RAM 16. Using one or more programs being loaded onto the RAM 16, the CPU 11 performs a desired operation using one or more devices of the printer controller 10.

The ASIC 12 may process various data according to one or more programs, which may be stored in the ROM 14. The timer 13 may generate time information indicating current date or time.

The CPU 11 may be provided with one or more memories, including, for example, the ROM 14, font ROM 15, RAM 16, and HDD 17. The ROM 14 may store one or more programs, which may cause the CPU 11 or ASIC 12 to perform a desired operation. Further, the ROM 14 may store other kind of data, which may be used by the CPU 11 or ASIC 12.

Figure 6:
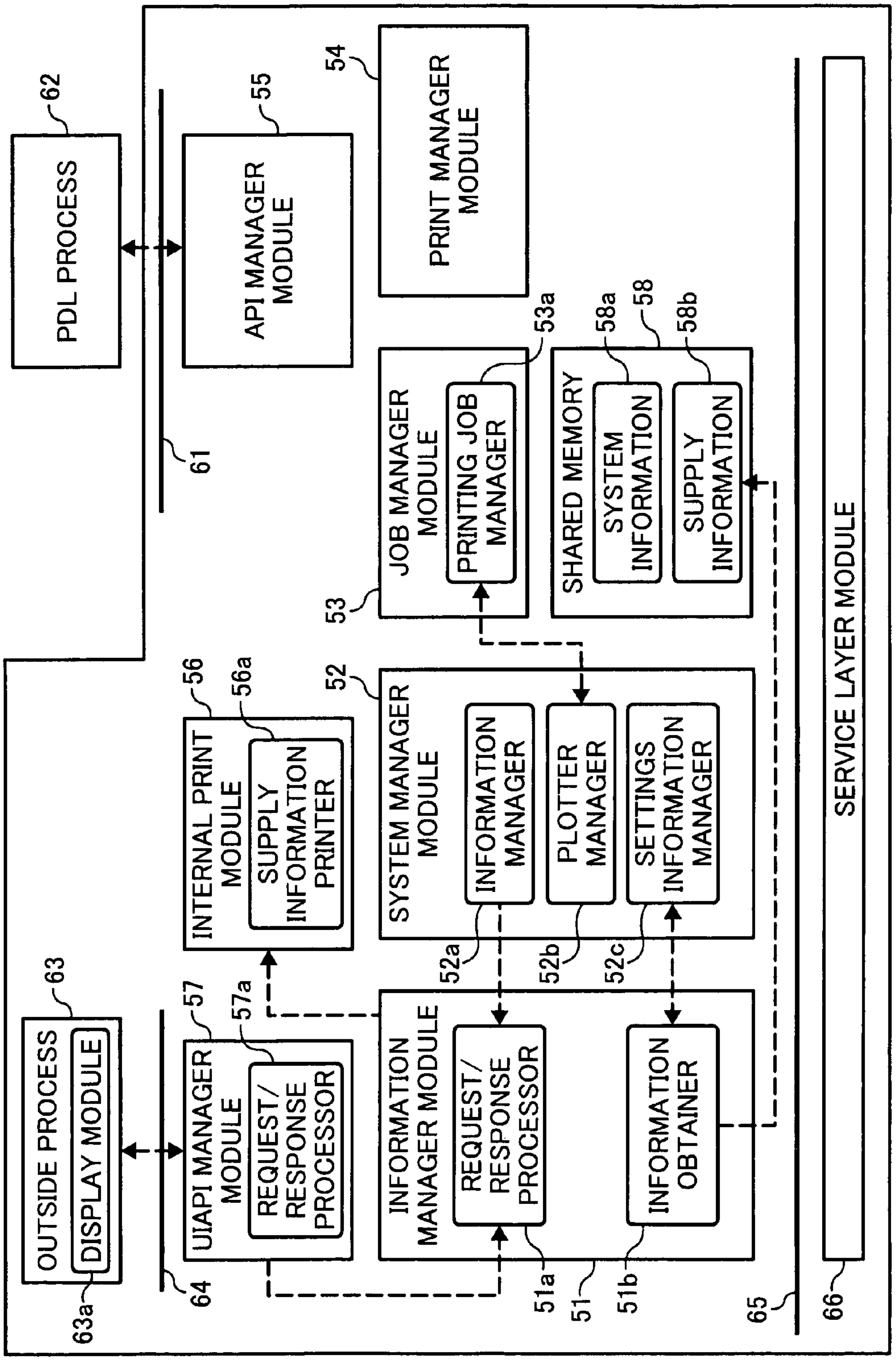
FIG. 6 is a schematic block diagram illustrating the software structure of a printer controller shown in FIG. 2, according to an example embodiment of the present invention.

The font ROM 15 may store various kinds of font data for printing. The RAM 16 may function as a program memory for deploying various programs such as the OS program or application programs, a work memory to be used by the CPU 11 for processing various data, a buffer area for storing print data to be printed on one page of document, a bit map memory for storing image data converted from the print data, or a shared memory 58 storing various information relating to the supply of the image forming device such as supply information 58*b* (FIG. 6). In this example, the RAM 16 may be implemented by a nonvolatile RAM (NVRAM). Alternatively, one or more NVRAMs may be provided in addition to the RAM 16. The HDD 17 stores a large amount of data, including, for example, various kinds of programs including the OS program or the application programs, print data to be printed, information relating to the print data, etc. Various information relating to the supply of the image forming device, such as the supply information, may be stored in the HDD 17.

The CPU 11 may be further provided with one or more interfaces, including, for example, the NIC 18, host I/F 19, engine I/F 20, panel I/F 21, medium I/F 22, and card I/F 23. The NIC 18 allows the printer controller 10 to communicate with the network 2. The NIC 18 may be implemented, for example, by a network interface card, which may be removed from the image forming apparatus 1. The host I/F 19 controls communication between the printer controller 10 and the host apparatus 40, for example, to allow reception of print data or control data sent from the host apparatus 40 or transmission of status data to the host apparatus 40. The engine I/F 20 controls communication between the printer controller 10 and the printer engine 30, for example, to allow outputting of image data or control data to the printer engine 30 or inputting of status data from the printer engine 30. The panel I/F 21 controls communication between the printer controller 10 and the operation panel 31. The medium I/F 22 controls communication between the printer controller 10 and an external medium, which may be attached to or removed from a slot provided on the printer 1. For example, the CPU 11 may recognize whether the external medium is accessible by checking the change in voltage caused by inserting or removing the external medium into or from the slot.

The card I/F 23 controls communication between the printer controller 10 and an external card, which may be attached or removed from a slot provided on the printer 1. In one example, the external card may be implemented by a SCSI card, which connects the printer 1 with a charging device provided in the image forming system of FIG. 1. In another example, the external card may be implemented by an identification card, which provides identification information of a user to the printer 1.

The operation panel 31 has at least one of the functions of outputting status data received from the printer controller 10 to the user, and inputting control data to the printer controller 10 received from the user. For example, the operation panel 31 may include a display device, such as a liquid crystal display (LCD) capable of displaying various data. Additionally or alternatively, the operation panel 31 may include an input device capable of inputting various settings information received from the user, which may be implemented by any number of keys, keyboard, ten key, switch, pointing device, etc. Additionally or alternatively, the operation panel 31 may be implemented by a touch panel, which provides the functions of outputting and inputting.

The printer engine 30 includes an image forming device and a detector 130. In one example, the printer engine 30 performs printing operation under control of the printer controller 10 using the image forming device. For example, the printer engine 30 forms a toner image according to the image data and the control data received from the printer controller 10. In another example, the printer engine 30 detects supply information of the image forming device using the detector 130, sends the supply information to the printer controller 10 for storage, and outputs the supply information using the image forming device under control of the printer controller 10.

In the example case of forming a toner image, the printer controller 10 causes the printer engine 30 to form a toner image according to print data received from the host apparatus 40 or the terminal 3. In such case, the CPU 11 performs printing operation according to a printer application program, using any one of the NIC 18, host I/F 19, and engine I/F 20. First, the CPU 11 obtains data, which includes print data and control data, from the host apparatus 40 through the host I/F 19 or the terminal 3 through the NIC 18. The CPU 11 converts the print data to image data. The CPU 11 sends the image data through the engine I/F 20 to the printer engine 30, and instructs the printer engine 30 to form a toner image according to the image data.

Figure 3:
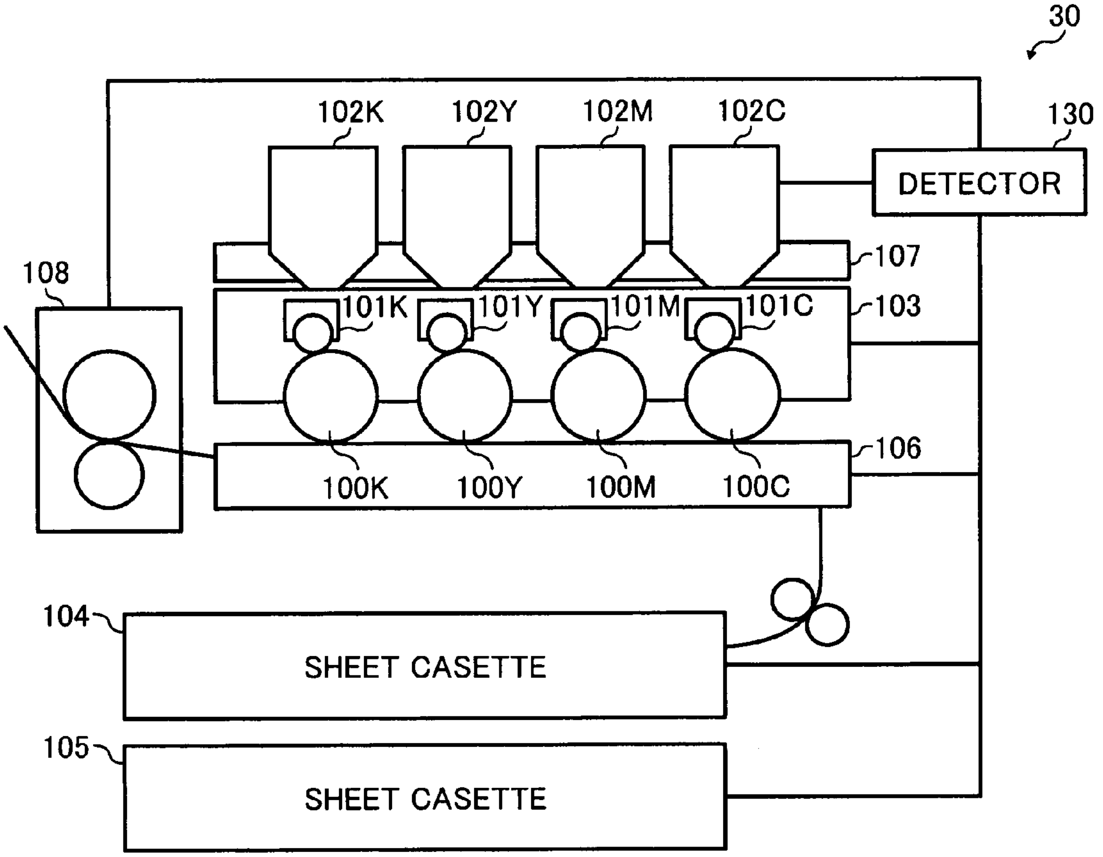
FIG. 3 is a schematic block diagram illustrating the structure of a selected portion of a printer engine shown in FIG. 2, according to an example embodiment of the present invention.
Figure 4:
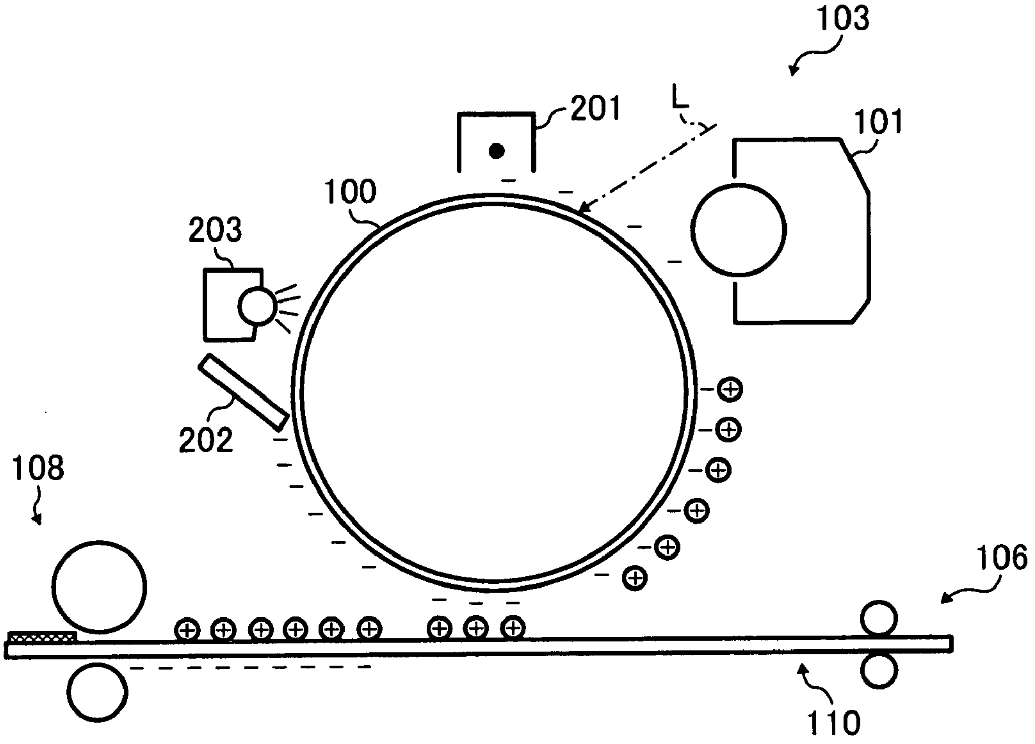
FIG. 4 is a schematic block diagram illustrating the structure of an image forming unit shown in FIG. 3, according to an example embodiment of the present invention.
Figure 5:
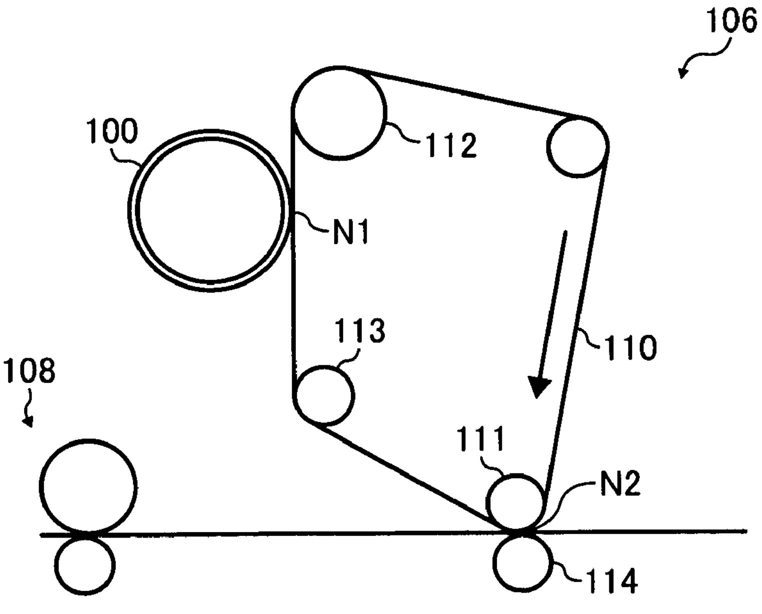
FIG. 5 is a schematic block diagram illustrating the structure of a transfer device shown in FIG. 3, according to an example embodiment of the present invention.

Referring now to any one of FIGS. 3, 4, and 5, the structure of the printer engine 30 is explained according to an example embodiment of the present invention.

Referring to FIG. 3, the printer engine 30 may include four image forming units 103K, 103Y, 103M, and 103C (collectively referred to as "the image forming unit 103), four toner cartridges 102K, 102Y, 102M, and 102C (collectively referred to as "the toner cartridge 102"), sheet feeding cassettes 104 and 105, a transfer device 106, an optical writing device 107, a fixing device 108, and the detector 130. In this example, the image forming unit 103 may have the tandem type structure, which includes four photoconductors 100K, 100Y, 100M, and 100C (collectively refereed to as the "photoconductor 100") for the respective colors of black, yellow, magenta, and cyan. For each of the photoconductors 100K, 100Y, 100M, and 100C, one or more devices are provided, for example, as illustrated in FIG. 4.

As illustrated in FIG. 4, the image forming unit 103 additionally includes a charging device 201, a developing device 101, a cleaning device 202, and a discharging device 203, which are provided in a vicinity of the photoconductor 100.

The charging device 201 uniformly charges the surface of the photoconductor 100 to a predetermined polarity. The optical writing device 107 (FIG. 3) exposes a modulated light L to the charged surface of the photoconductor 100 to form a latent image on the charged surface of the photoconductor 100. For example, the optical writing device 107 may module a light beam emitted from a light source according to the image data received from the printer controller 10 (FIG. 2), and scans the modulated light L in the main scanning direction and sub-scanning direction of the surface of the photoconductor 100 to form the latent image. The developing device 101 develops the latent image into a toner image, by applying toner having the reverse of the predetermined polarity. The toner may be provided from the corresponding toner cartridge 102 of FIG. 3. The toner image, formed on the surface of the photoconductor 100, is transferred to the surface of a recording sheet, which may be carried by a transfer belt 110 of the transfer device 106. The recording sheet may be fed by either one of the sheet feeding cassettes 104 and 105 shown in FIG. 3. The cleaning device 202 removes the residual toner, which may be remained on the surface of the photoconductor 100 after transferring the image, from the surface of the photoconductor 100. In this example, the cleaning device 202 may be implemented by a brush such as a magnetic brush, or a blade. The residual toner collected by the cleaning device 202 may be stored in a used toner bottle, not illustrated. The discharging device 203 discharges the charged surface of the photoconductor 100 after transferring the image. The recording sheet having the toner image thereon is further carried by the transfer device 106 to the fixing device 108. When the recording sheet passes through the fixing device 108, the toner image is fixed onto the surface of the recording sheet by heat and pressure. In this example, the fixing device 108 may include a lubricant agent supplying device, not illustrated. When fixing, a lubricant agent, such as oil, may be supplied to the fixing device 108.

In this example, the transfer device 106 may transfer the toner image onto the recording sheet in two steps. As illustrated in FIG. 5, the transfer belt 110 of the transfer device 106 may be implemented by an intermediate transfer belt. In such case, the transfer device 106 may additionally include a driver roller 111, a transfer bias roller 112, a transfer earth roller 113, and a sheet transfer roller 114. The transfer belt 110, which is an endless belt wound around the driver roller 111, the transfer bias roller 112, and the transfer earth roller 113, is driven by the drive roller 111 in the direction indicated by the arrow. The transfer belt 110 is in close contact with the surface of the photoconductor 100 at a first transfer position N1 at which the toner image formed on the surface of the photoconductor 100 is transferred to the surface of the transfer belt 110. The transfer belt 110 is in close contact with the sheet transfer roller 114 at a second transfer position N2 at which the toner image carried by the transfer belt 110 is transferred to the surface of a transfer belt that passes through the nip formed between the rollers 111 and 114. When the recording sheet carrying the toner image passes through the fixing device 108, the toner image is fixed onto the recording sheet by heat and pressure applied by the fixing device 108. The recording sheet having the fixed toner image is discharged from the printer 1 to complete printing operation.

In alternative to the structure shown in FIG. 3, 4, or 5, the image forming device of the printer engine 30 may be implemented in various other ways. For example, the transfer device 106 of FIG. 4 may not be provided with the intermediate transfer belt 110. In such case, the toner image formed on the photoconductor 100 may be directly transferred onto the transfer belt transferring the recording sheet toward the fixing device 108. In another example, the position or size of each device provided in the image forming device of the printer engine 30 may be different from the position or size shown in any one of FIGS. 3 to 5.

As mentioned above referring to FIG. 2, in another example operation, the printer controller 10 may manage supply information, such as supply amount information or supply status information, regarding the image forming device provided in the printer engine 30. In this example, the supply amount information of the image forming device corresponds to any information obtainable by the detector 130, which describes the amount of a supply of the image forming device provided in the printer 1 ("the printer supply"), including, for example, the degree of usage of the device, the remaining life time of the device, the amount of consumption of a supply managed by the device, or the remaining amount of the supply managed by the device. In this example, the supply status information corresponds to any information relating to the current status of the printer supply, such as the near end state or the end state of the printer supply. In this specification, the near end state refers to the state in which the supply is in need of replacement or refill soon. The end state refers to the state in which the supply is in need of replacement or refill now. Additionally or alternatively, the supply status information may correspond to information indicating whether the printer supply is a legitimate product that can be warranted by a manufacturer.

In order to obtain supply amount information regarding the photoconductor 100, the detector 130 may be implemented by a counter capable of counting the number of rotations of the photoconductor 100 or a timer capable of counting a time period during when the photoconductor 100 is in operation. In another example, in order to obtain supply amount information regarding the developing device 101, the detector 130 may be implemented by a counter capable of counting the number or rotations of a developing roller of the developing device 101 or a timer capable of counting a time period during when the developing device 101 is in operation. In another example, in order to obtain supply amount information regarding the transfer device 106, the detector 130 may be implemented by a counter capable of counting the number of rotations of the transfer belt 110 or a timer capable of counting a time period during when the transfer device 106 is in operation. In another example, in order to obtain supply amount information regarding the fixing device 108, the detector 130 may be implemented by a counter capable of counting the number of rotations of a roller provided in the fixing device 108 or a timer capable of counting a time period during when the fixing device 108 is in operation. In another example, in order to obtain supply amount information regarding the toner cartridge 102, the detector 103 may be implemented by a toner sensor capable of detecting the amount of toner remained in the toner cartridge 102. In another example, in order to obtain supply amount information regarding the cleaning device 202, the detector 130 may be implemented by a used toner bottle sensor capable of detecting the amount of used toner stored in the used toner bottle of the cleaning device 202. In another example, in order to obtain supply amount information regarding the fixing device 108, the detector 130 may be implemented by an oil supply sensor capable of detecting the amount of oil remained in the fixing device 108. In another example, in order to obtain supply amount information regarding the sheet feeding cassette 104 or 105, the detector 130 may be implemented by a sheet sensor capable of detecting the amount of sheets remained in the sheet feeding cassette 104 or 105.

For the illustrative purpose, an example operation of obtaining supply amount information regarding the photoconductor 100 using the detector 130 is explained below.

By repeating the image forming operation described above referring to FIG. 4, which may include charging, exposing, developing, transferring, fixing, and cleaning, the surface of the photoconductor 100 may be degraded such that the surface of the photoconductor 100 may be worn or scratched, or photoconductivity of the photoconductor 100 may be lowered. This may cause one or more problems, including lower image quality, abnormal amount of toner consumption, or jamming of a recording sheet. In light of this, the photoconductor 100 is replaced when degradation of the photoconductor 100 is detected. Further, when degradation of the photoconductor 100 is detected, image forming operation of the printer 1 may be restricted or may not be performed such that further degradation of the photoconductor 100 may be suppressed. In order to obtain supply amount information, the detector 130 counts an accumulated time period in which the photoconductor 100 is driven by a drive motor to obtain a counted time period. Further, in this example, the counted time period may be converted to the number of pages ("the number of printed pages"), using information regarding the counted time period for printing one page of recording sheet. The number of printed pages may be stored in a nonvolatile memory, such as the RAM 16 or the HDD 17, as the supply amount information of the photoconductor 100.

For the illustrative purpose, an example operation of obtaining supply amount information regarding the toner cartridge 102 is explained below.

By repeating the developing operation as described above referring to FIG. 4, toner is consumed. Even when a monochrome or color toner image is not formed on a recording sheet, toner may be consumed as long as the developing device 101 is in operation since the toner may function as a buffering agent to suppress friction generated between the developing device 101 and the photoconductor 100. When all toner stored in the toner cartridge 102 is consumed, a toner image may not be formed with high quality. Additionally, when all toner stored in the toner cartridge 102 is consumed, the photoconductor 100 may be easily degraded due to the friction generated between the developing device 101 and the photoconductor 100. Further, since no toner is applied to the charged surface of the photoconductor 100, the recording sheet may be brought into direct contact with the surface of the photoconductor 100, thus damaging the photoconductor 100 or causing jamming of the recording sheet. In light of this, the toner cartridge 102 is replaced when low toner supply is detected. Further, when lower toner supply is detected, image forming operation of the printer 1 may be restricted or may not be performed such that further toner consumption may be suppressed. In order to obtain supply amount information, the detector 130 detects the amount of toner remained in the toner cartridge 102 ("the remaining toner amount"), for example, by detecting the total weight of toner or detecting the height made by the accumulated toner. The remaining toner amount may be stored in a nonvolatile memory, such as the RAM 16 or the HDD 17, as the supply amount information of the toner cartridge 102.

Figures 8A, 8B, 9:
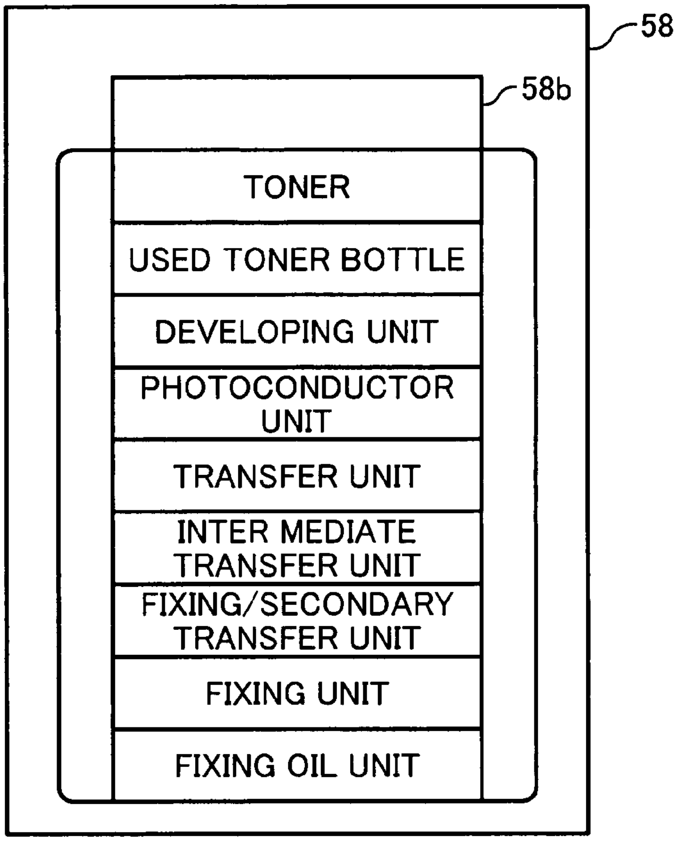
FIG. 8A is an illustration of an example data structure of supply information stored in the printer controller shown in FIG. 2.
FIG. 8B is an illustration of an example data structure of supply information stored in the printer controller shown in FIG. 2.
FIG. 9 is an example table storing supply information.

The supply information detected by the detector 130, such as the supply amount information and/or the supply status information, may be stored in any desired memory in the form manageable by the printer controller 10. For example, the supply information may be stored in the shared memory 58 as illustrated in any one of FIGS. 6, 8, and 9. Further, in this example, the display settings information and/or the printing settings information may be stored in the form manageable by the printer controller 10, for example, in the shared memory 58 as illustrated in FIG. 9. The shared memory 58 may correspond to any desired nonvolatile memory, such as the RAM 16 or the HDD 17 of FIG. 2.

In one example, the printer controller 10 may update supply amount information upon receiving notification from the printer engine 30 that supply information is updated. For example, the printer engine 30 sends notification to the printer controller 10 every time the number of printed pages is increased by 10%, with 0% corresponding to the state in which the photoconductor 100 is just installed. In another example, the printer engine 30 sends notification to the printer controller 10 every time the remaining toner amount is decreased by 5%, with 100% corresponding to the state in which the remaining toner amount is full. When notified, the printer controller 10 may update the supply amount information stored in the memory. At this time, the printer controller 10 may display a selection key that allows the user to select whether to print the updated supply amount information, or a notification message that the supply amount information is updated. Upon receiving a request for printing supply amount information, the printer controller 10 may obtain the updated supply information, convert the updated supply amount information in a form determined by the print settings information, and print the updated supply amount information on a recording sheet.

In another example, the printer controller 10 may update supply status information upon receiving notification from the printer engine 30 that the printer supply is in the near end state or end state. For example, the printer engine 30 sends notification to the printer controller 10 when the number of printed pages reaches a first reference level previously set by the user, such as 45,000 pages, to indicate that the photoconductor 100 is in the near end state. Alternatively or additionally, the printer engine 30 sends notification to the printer controller 10 when the number of printed pages reaches a second reference level previously set by the user, such as 50,000 pages, to indicate that the photoconductor 100 is in the end state. In another example, the printer engine 30 sends notification to the printer controller 10 when the remaining toner amount reaches a first reference level previously set by the user, such as 15%, to indicate that the toner is in the near end state. Alternatively or additionally, the printer engine 30 sends notification to the printer controller 10 when the remaining toner amount reaches a second reference level previously set by the user, such as 0%, to indicate that the toner is in the end state. When notified, the printer controller 10 may update the supply status information stored in the memory. At the same time or upon receiving a request for printing supply status information, the printer controller 10 may obtain the updated supply status information, convert the updated supply status information in a form determined by the print settings information, and print the updated supply status information on a recording sheet. Since the reference level for determining the end state or near end state of the printer supply can be changed according to the user preference, the end state or near end state of the printer supply may be detected at timing appropriate for the user. In this example, the reference level for determining the end state of the printer supply is set by the user. Alternatively, the reference level for determining the end state of the printer supply may be set by default.

In another example, the printer controller 10 may obtain supply amount information or supply status information upon receiving a request for printing supply information from any one of the operation panel 31, the host apparatus 40, and the terminal 3. Upon receiving a request for printing supply information, the printer controller 10 may obtain the supply information stored in the memory, convert the supply information in a form determined by the printing settings information, and print the supply information on a recording sheet. At the time of obtaining, the supply information may be updated.

In another example, the printer controller 10 may update supply status information indicating whether the printer supply is the legitimate product ("legitimacy information"), for example, by detecting identification information provided on the printer supply, such as integrated circuit (IC) chip information. For example, the printer engine 30 may determine whether the toner cartridge 102 is the legitimate product by detecting the IC chip provided on the toner cartridge 102, and send notification to the printer controller 30. When notified, the printer controller 102 may update the legitimacy information, and further convert the legitimacy information to the form perceptible to a user for output. For example, the printer controller 10 may notify the user that the illegitimate product is used, for example, by printing a notification message or a mark indicating that the illegitimate product is used. In this manner, the use of illegitimate product may be suppressed.

In any one of the above-described examples, the supply information may be printed according to the print settings information, which may be previously set by default or according to the user preference. For example, the print settings information may determine the appearance of a supply information list having the supply information, the contents or types of supply information to be included in the supply information list, timing for printing the supply information list, the paper type of a recording sheet on which the supply information list is printed, an apparatus to output the recording sheet having the supply information list, a position or location at which the recording sheet having the supply information list is discharged, a user who is allowed to print the supply information list, a user who is allowed to print the supply information using a selected printer, etc.

Further, in any one of the above-described examples, before printing the supply information, the printer controller 10 may determine whether the printer 1 is currently performing a printing job. When the printing job is currently being performed, the printer controller 10 may interrupt the printing job or allow the user to determine whether to interrupt the printing job. In such case, the supply information may be printed in a manner such that the user may easily recognize that the supply information is printed. For example, the recording sheet having the supply information may be discharged onto a tray different from a tray having a printed recording sheet.

Figure 7:
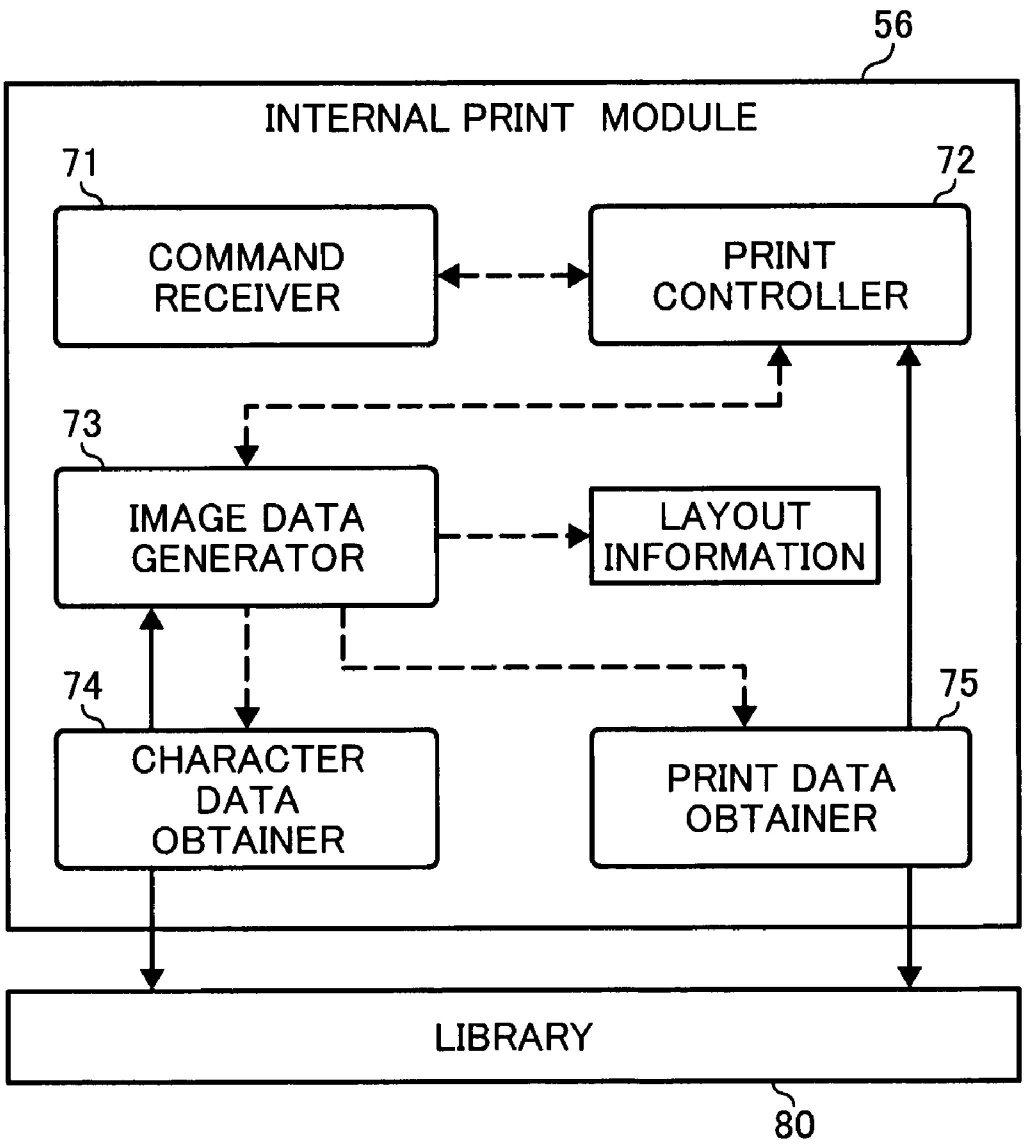
FIG. 7 is a schematic block diagram illustrating the structure of an internal print module of the printer controller shown in FIG. 2, according to an example embodiment of the present invention.

Referring now to FIGS. 6 and 7, an example software structure of the printer controller 10 is explained.

Referring to FIG. 6, the printer controller 10 includes an information manager module 51, a system manager module 52, a job manager module 53, a print manager module 54, an application programming interface (API) manager module 55, an internal print module 56, and a user interface API (UIAPI) manager module 57. The above-described modules 51, 52, 53, 54, 55, 56, and 57, which may be collectively referred to as the printer application program, may communicate with the other process or layer. For example, the printer application program communicates with a page description language (PDL) process 62 through a PDL-API 61 to receive image data, which may be converted by the PDL process 62 from the print data received from the outside. In another example, the printer application program communicates with an outside process 63 including a display module 63*a* through a UIAPI 64 to cause the operation panel 31 (FIG. 2) or the display device of the host apparatus 40 or the terminal 3 to display various information, such as supply information. In another example, the printer application program communicates with a service layer module 66 through a SYSTEM-API 65 to control one or more application programs or OS programs, which may run on the CPU 11 of the printer controller 10. For example, the printer application program may communicate with the printer engine 30 through the service layer module 66 to send the image data to the printer engine 30 or receive supply information from the printer engine 30.

Still referring to FIG. 6, the information manager module 51 may be responsible for managing supply information. In one example, the information manager module 51 may function as a request/response processor 51*a*, which may be responsible for receiving or sending a request relating to supply information. In another example, the information manager module 51 may function as an information obtainer 51*b*, which may be responsible for managing the supply information 58*b* stored in the shared memory 58 such as obtaining the supply information from the shared memory 58, or determining whether to obtain the supply information by referring to the settings information managed by the system manager module 52. The supply information being obtained may be updated at the time of obtaining.

The information manager module 51 may receive the request relating to the supply information from the outside through the UIAPI manager module 57, or internally from the system manager module 52, as the arrows in FIG. 6 indicate. For example, the information manager module 51 may receive the request for obtaining or updating the supply information from the outside process 63 through the UIAPI manager module 57 when the UIAPI manager module 57 receives a request for displaying or printing the supply information from the outside process 63. In another example, the information manager module 51 may receive the request for updating supply information from the system manager module 52 when the system manager module 52 receives notification that the supply information is updated from the service layer module 66. Further, the information manager module 51 may send the request relating to the supply information to the internal print module 56, for example, as the arrow shown in FIG. 6 indicates.

The system manager module 52 may be responsible for managing the status of the system of the printer 1. For example, the system manager module 52 may function as a settings information manager 52*c*, which manages the settings information such as display or print settings information. As described below, the print settings information may include print/unprint information indicating whether to print the supply information, tray information indicating whether to allow the user to select a tray to output the supply information, access restriction information indicating whether to restrict printing of the supply information, alternate printing activation information indicating whether alternate printing is activated, alternate printing restriction information indicating whether to restrict alternate printing, etc. In addition to the display or print settings information, the settings information manager 52*c* may manage power supply information indicating whether the printer engine 30 is in an operation mode or an energy save mode. The power supply information may be stored in the shared memory 58.

In another example, the system manager module 52 may function as a plotter manager 52*b*, which determines whether printing operation is currently being performed by the printer engine 30. Alternatively, the system manager module 52 may function as an information manager 52*a*, which may be responsible for managing the request relating to the supply information such as initializing the information manager module 51 or the shared memory 58, or sending the request for obtaining or updating the supply information to the information manager module 51. For example, the information manager 52*a* of the system manager module 52 may send the request for updating supply information upon receiving notification from the printer engine 30 that the supply information is updated. Further, the system manager module 52 may be provided with the function of managing user identification (ID) information or device identification (ID) information, which may be stored in the shared memory 58.

The job manager module 53 may be provided a printing job manager 53*a*, which is responsible for managing a printing job. In one example, the job manager module 53 may hold printing of the supply information when the plotter manager 52*b* indicates that the printer engine 30 is currently performing a printing job. In another example, the job manager module 53 may instruct the plotter manager 52*b* to interrupt a printing job currently performed upon receiving a request for printing supply information.

The printer manager module 54 may be responsible for managing printing of image data performed by the printer engine 30.

The API manager module 55 manages communication between the printer application program and the PDL process 62 through the PDL-API 61.

The internal print module 56 may be responsible for printing information other than the image data including, for example, system settings information, an error log, supply information, etc. In this example, the system settings information, which may include the print settings information, may be stored in the shared memory 58 ("system information 58*a*"). The error log may be obtained from the job manager module 53. Printing of supply information may be performed by a supply information printer 56*a*.

Figure 18:
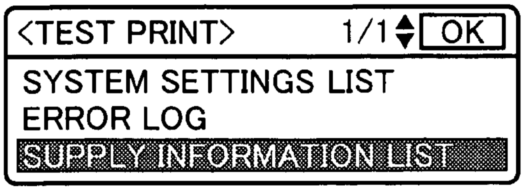
FIG. 18 is an illustration of an example screen displayed by the image forming apparatus shown in FIG. 2.

For example, the printer 1 may display a screen illustrated in FIG. 18 on the operation panel 31 upon detecting a user instruction for selecting the test print function. The printer 1 causes the internal print module 56 to print the system settings information when the "system settings list" is selected by the user through the operation panel 31. The printer 1 causes the internal print module 56 to print the error log when the "error log" is selected by the user through the operation panel 31. The printer 1 causes the internal print module 56 to print the supply information list when the "supply information list" is selected by the user through the operation panel 31.

The UIAPI manager module 57 manages communication between the printer application program and the outside process 63 through the UIAPI 64. The UIAPI manager module 57 may be provided with a request/response processor 57*a*, which receives or sends a request relating to the supply information. For example, the UIAPI manager module 57 may receive a request for displaying or printing the supply information from the outside process 63, and send a request for obtaining supply information to the information manager module 51.

Referring to FIG. 7, the internal print module 56 of FIG. 6 includes a command receiver 71, a print controller 72, an image data generator 73, a character data obtainer 74, and a print data obtainer 75.

The command receiver 71 receives an event, such as a request, from the outside process 63. For example, when the request for printing is received, the command receiver 71 may analyze the printing request, and notifies the printer controller 72 that the printing request is received.

The print controller 72 may control printing operation upon receiving the printing request. For example, the printer controller 72 may obtain a frame or a band.

The image data generator 73 generates or draws image data, for example, using layout information.

The character data obtainer 74 and the print data obtainer 75 each obtain information to be used by the image data generator 73 when generating or drawing the image data, for example, by accessing a library 80 storing a plurality of functions to be used for generating or drawing. Alternatively, the character data obtainer 74 and the print data obtainer 75 may obtain supply information through the information manager module 51 (FIG. 6) when the request for printing supply information is received.

As described above, the CPU 11 of FIG. 2 may manage supply information using the printer application program of FIG. 6. For example, referring to FIG. 10, the CPU 11 may mainly perform the functions of updating supply information, obtaining supply information, and printing supply information. As described above, the supply information may be stored in the shared memory 58 (FIG. 6) in the form manageable by the printer controller 10.

For example, the supply information 58*b* (FIG. 6) may have a data structure shown in FIG. 8A, which stores various information for each one of a desired number of printer supplies of the image forming device in the form of array. For example, supply information and print settings information may be stored in a corresponding manner for each one of the printer supplies.

As illustrated in FIG. 8B, each supply being selected for printing may be assigned with an arbitrary digit number. In the example case illustrated in FIG. 8B, the toner is assigned with the number 0. The used toner bottle is assigned with the number 1. The developing unit is assigned with the number 2. The photoconductor unit is assigned with the number 3. The transfer unit is assigned with the number 4. The intermediate transfer unit is assigned with the number 5. The fixing/secondary transfer unit is assigned with the number 6. The fixing unit is assigned with the number 7. The fixing oil unit is assigned with the number 8. By arranging supply information regarding a selected in a position determined by the digit number being assigned to the selected supply, the supply information may be recognized even when such information is expressed in a sequence of numerical data as illustrated in FIG. 8B.

For example, the supply amount information, which may be obtained from the printer engine 30 at predetermined timing, may be stored for the selected number of supplies. When the supply amount information is indicated by the remaining amount of the supply, the supply amount information may be expressed in percentage with 100% indicating the full state of the supply. In another example, the supply status information may be stored for the selected number of supplies. The supply status information may be expressed as a negative integer. In this example, the negative integer "−1" may indicate that the supply is illegitimate or the supply amount information is unknown. The negative integer "−2" may indicate that the supply is in the near end state. The negative integer "−3" may indicate that the supply is in the normal state.

Further, in this example, the print settings information indicating whether to print the supply information ("print/unprint information") may be stored for the selected number of supplies. The print/unprint information may be expressed in the form of flag information, which may be expressed by "0", "1", "ON" or "OFF". As illustrated in FIG. 8B, the flag information of "0" indicates that the print/unprint information is set to not to print. The flag information of "1" indicates that the print/unprint information is set to print.

In this example, the print/unprint information may be set substantially equal to the display settings information indicating whether to display the supply information (display/undisplay information). Alternatively, the print/unprint information may be set to have a different value from the value of the display/undisplay information. In such case, the display/undisplay information may be additionally stored as part of the supply information 58*b*.

In addition to the print/unprint information, the other kind of print settings information may be stored for a selected number of printer supplies including, for example, print settings information indicating whether to print the supply status information when the near end state of the supply is detected ("near end print/unprint information"), print settings information indicating whether to print the supply status information when the end state of the supply is detected ("end print/unprint information"), or print settings information indicating whether to print the supply information when an error is detected in the printer 1. Additionally, tray information indicating whether to select a tray for outputting the supply information according to the user instruction, access restriction information indicating whether to restrict printing of the supply information, alternate printing activation information indicating whether alternate printing is activated, or alternate printing restriction information indicating whether to allow alternate printing may be stored as the print settings information. Further, the supply information 58*b* storing the supply information and the print settings information in a corresponding manner may be prepared for each one of a selected number of registered users.

In alternative to the data structure shown in FIG. 8A or 8B, the supply information may be stored in the form of table, which may store a supply name, supply information, and print settings information in a corresponding manner, for example, as illustrated in FIG. 9. Referring to FIG. 9, the supply information may be expressed by a character string indicating the status of the supply, or by a percentage value indicating the remaining amount of the supply.

Figure 10:
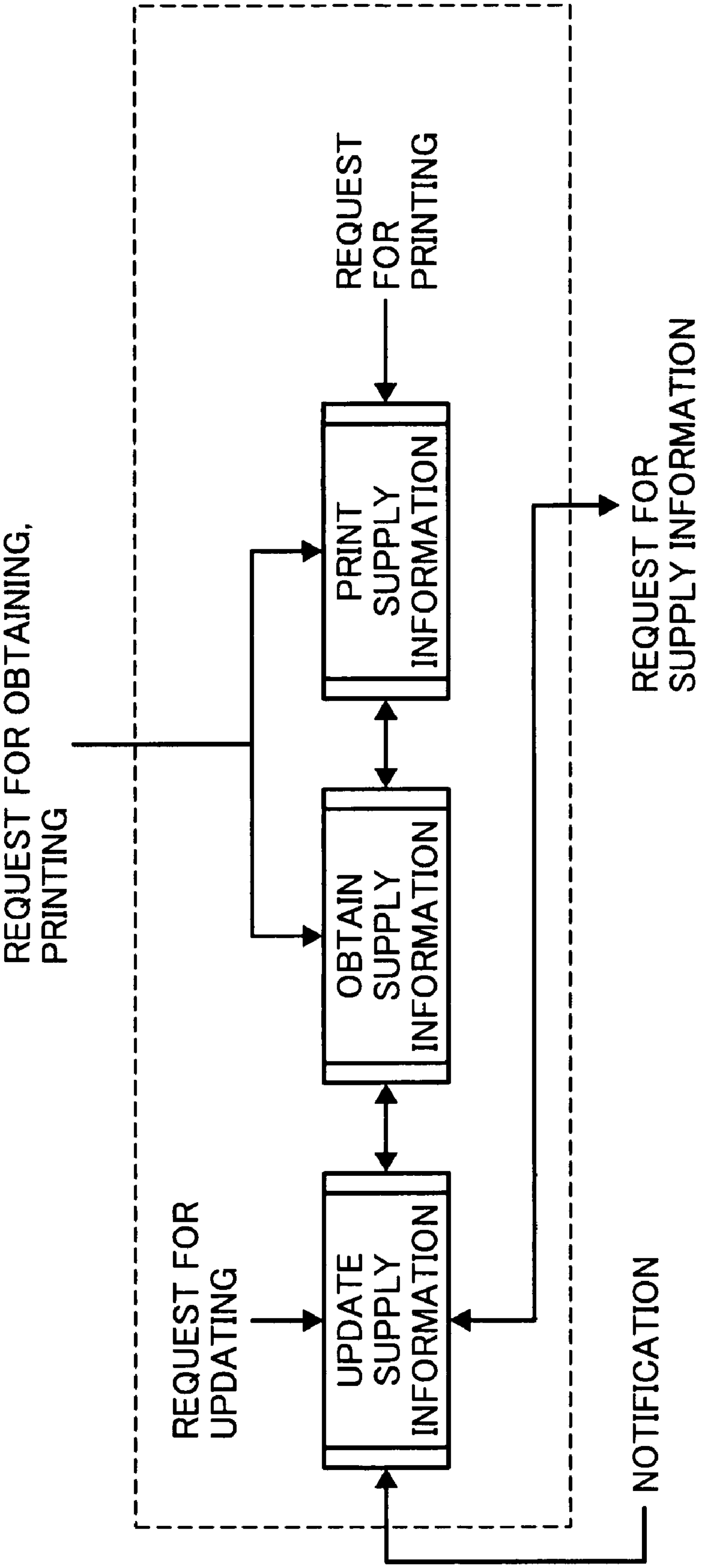
FIG. 10 is a schematic block diagram illustrating function or operation relating to supply information, performed by the printer controller shown in FIG. 2.

Referring to FIG. 10, in one example, the CPU 11 updates supply information stored in a nonvolatile memory such as the RAM 16 or the HDD 17 upon receiving notification from the printer engine 30 that the supply information is updated. In such case, the system manager module 52 (FIG. 6) sends a request for sending updated supply information to the printer engine 30 to obtain the updated supply information. The system manager module 52 then updates the supply information stored in the shared memory 58, using the updated supply information obtained from the printer engine 30. The system manager module 52 may further notify the information manager module 51 that the supply information is updated.

In another example, the CPU 11 updates supply information stored in a nonvolatile memory such as the RAM 16 or the HDD 17 upon receiving a request for updating supply information internally within the printer application program. For example, the request for updating supply information may be generated when a request for printing supply information is received from the outside.

In another example, the CPU 11 obtains supply information stored in a nonvolatile memory such as the RAM 16 or the HDD 17 upon receiving a request for obtaining supply information. For example, the request for obtaining supply information may be generated when a request for printing is received from the outside. In addition to obtaining the supply information, updating may be performed.

In another example, the CPU 11 obtains supply information stored in a nonvolatile memory such as the RAM 16 or the HDD 17, and prints the supply information upon receiving the request for printing supply information from the outside or internally within the printer application program. In addition to obtaining the supply information, updating may be performed.

Figure 11:
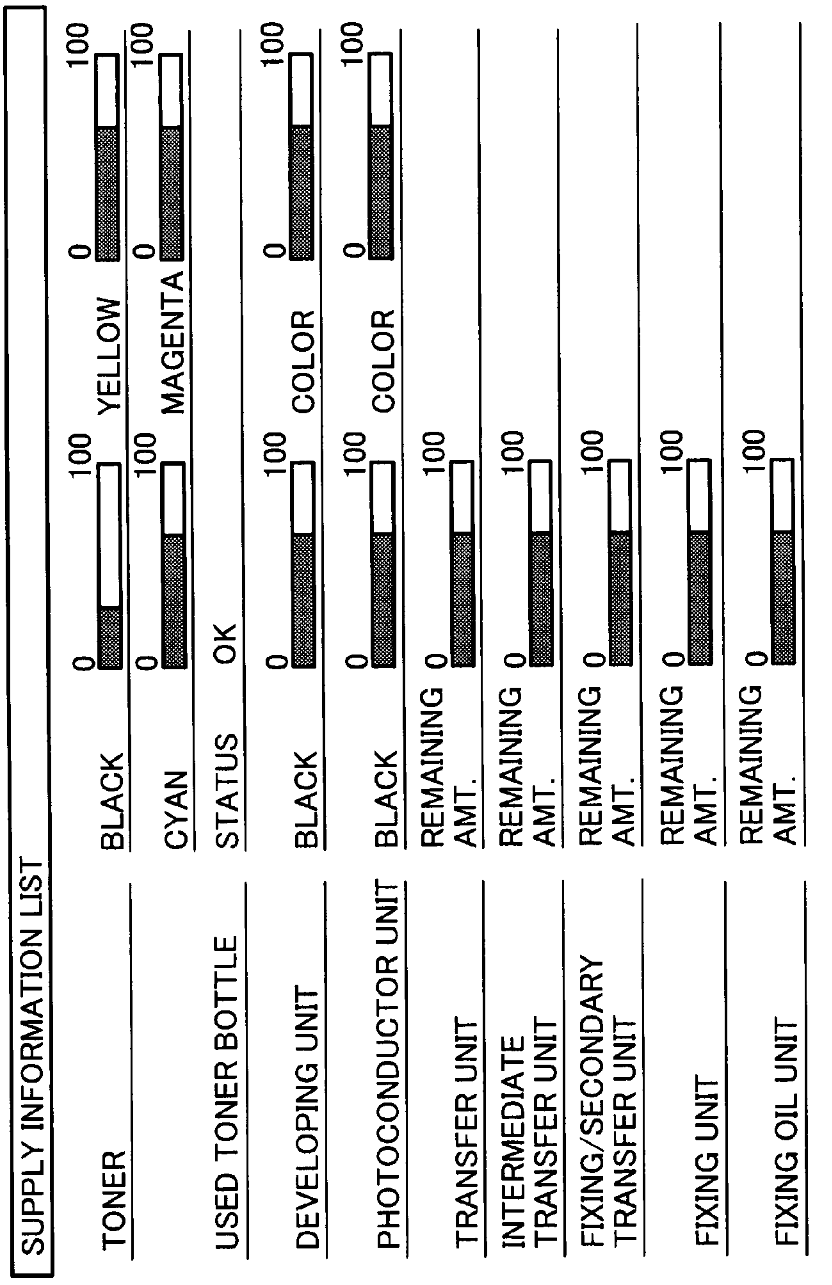
FIG. 11 is an example supply information list printed by the image forming apparatus shown in FIG. 2.

FIG. 11 illustrates an example supply information list, which may be printed by the printer 1 as the supply information. Referring to FIG. 11, the supply information list includes a supply name and supply amount information or supply status information for each one of a selected number of supplies. The supplies to be listed on the supply information list may be selected by a user, for example, by changing or inputting the print settings information through the operation panel 31 (FIG. 2), or the input device of the host apparatus 40 or the terminal 3. Alternatively, the supplies to be listed may be set by default.

Further, the unit or type of the supply amount information may be changed according to the print settings information. For example, referring to FIG. 11, the remaining amount is printed as the supply amount information. Alternatively or additionally, the used amount may be printed as the supply amount information. In another example, when more than one unit is provided for different colors, one or more units corresponding to any number of colors may be selected for printing according to the user preference.

Further, the appearance of the supply amount information may be changed according to the print settings information. For example, referring to FIG. 11, the supply amount information is displayed as a bar graph. Alternatively, the supply amount information may be displayed in any other desired form such as an icon or picture. Further, in this example, the scale of the bar graph may be graduated in 10% or 20%, depending on the characteristics of the detector 130 (FIG. 2). Alternatively, when the detector 130 is not capable of detecting with high precision, the supply amount information may be replaced by the supply status information indicating whether the supply is in the end state, near end state, or normal state. Referring to FIG. 11, the status "OK" of the used toner bottle indicates that the supply is in the normal state such that no replacement is required.

Figure 12:
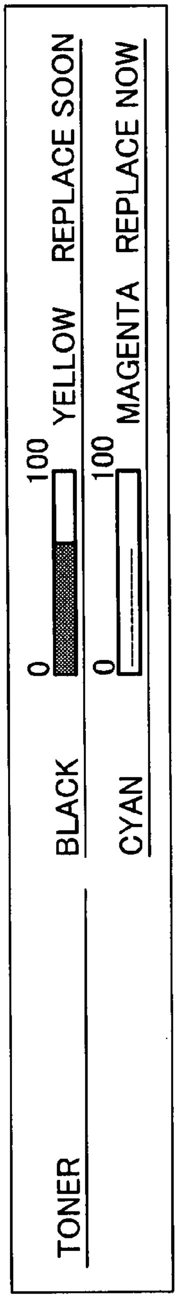
FIG. 12 is an example supply information list printed by the image forming apparatus shown in FIG. 2.

Alternatively or additionally, the supply status information may be printed in replace of the supply amount information, for example, as illustrated in FIG. 12. Referring to FIG. 12, the message "REPLACE SOON" printed for the yellow toner indicates that the yellow toner is in the near end state. The message "REPLACE NOW" printed for the magenta toner indicates that the magenta toner is in the end state.

Figure 13:
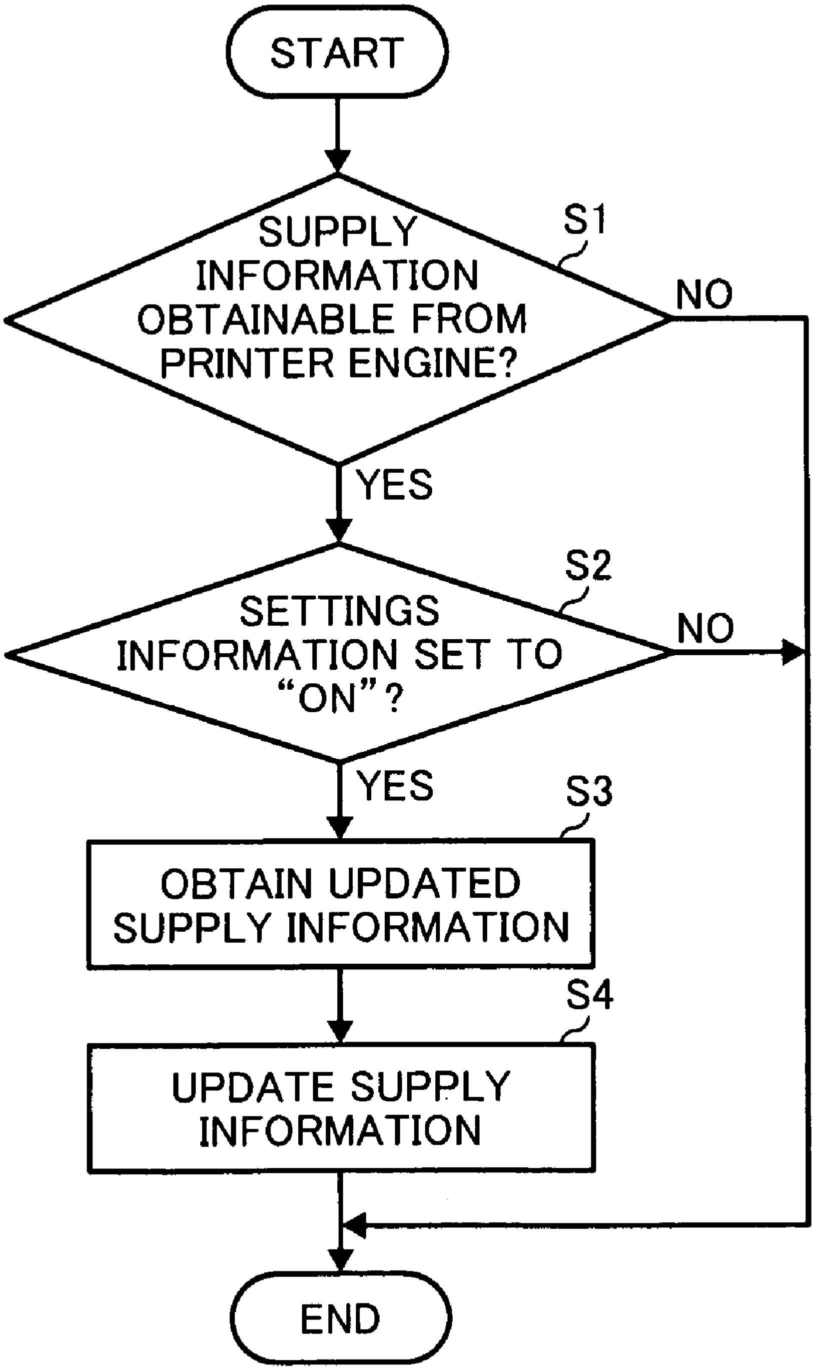
FIG. 13 is a flowchart illustrating operation of updating supply information according to an example embodiment of the present invention.

Referring now to FIG. 13, operation of updating supply information is explained according to an example embodiment of the present invention. As described above referring to FIG. 10, the operation of FIG. 13 may be performed by the CPU 11 according to the printer application program upon receiving notification that the supply information is updated from the outside of the system or upon receiving a request for updating supply information internally within the system.

S1 determines whether supply information is obtainable from the printer engine 30. When the supply information is obtainable ("YES" at S1), the operation proceeds to S2. When the supply information is not obtainable ("NO" at S1), the operation ends. For example, the printer 1 may operate under one of a plurality of modes including an operation mode and an energy save mode. In order to reduce the electric power consumption, the printer 1 may be set to automatically switch from the operation mode to the energy save mode when the idle state of the printer 1 is detected for a predetermined time period. In this example, a counted time period may be obtained by the timer 13 of the printer controller 10 (FIG. 2). When the printer 1 is in the energy save mode, the electric power is not supplied to the printer engine 30 such that supply information is not obtainable from the printer engine 30, thus updating of the supply information is not performed. Whether the printer 1 is in the operation mode or the energy save mode may be determined by referring to power supply information, which may be stored in a nonvolatile memory such as the RAM 16 (FIG. 2), for example, as flag information.

S2 obtains the print settings information such as the print/unprint information, and determines whether the print settings information is set to "ON" to print. When the print/ unprint information is set to "ON" ("YES" at S2), the operation proceeds to S3. When the print/unprint information is set to "OFF" ("NO" at S2), the operation ends. S2 may be performed for each one of the supplies of the printer engine 30 available for updating.

S3 causes the printer engine 30 to obtain updated supply information, for example, by sending a request for supply information.

S4 updates the supply information stored in the shared memory 58, which may be managed by the system manager module 52 and the information manager module 51, with the updated supply information obtained from the printer engine 30, and the operation ends.

The operation of FIG. 13 may be performed at any desired timing. In one example, the operation of FIG. 13 may be performed periodically. In another example, as described below, the operation of FIG. 13 may be performed upon receiving the request for obtaining supply information or printing supply information. In another example, the operation of FIG. 13 may be performed upon receiving notification that supply information is updated from the printer engine 30. In another example, the operation of FIG. 13 may be performed at timing when the printer 1 is switched from the operation mode to the energy save mode, or from the energy save mode to the operation mode. In another example, the operation of FIG. 13 may be performed after completing printing of supply information. In another example, the operation of FIG. 13 may be performed at timing when the printer 1 is turned on.

Figure 14:
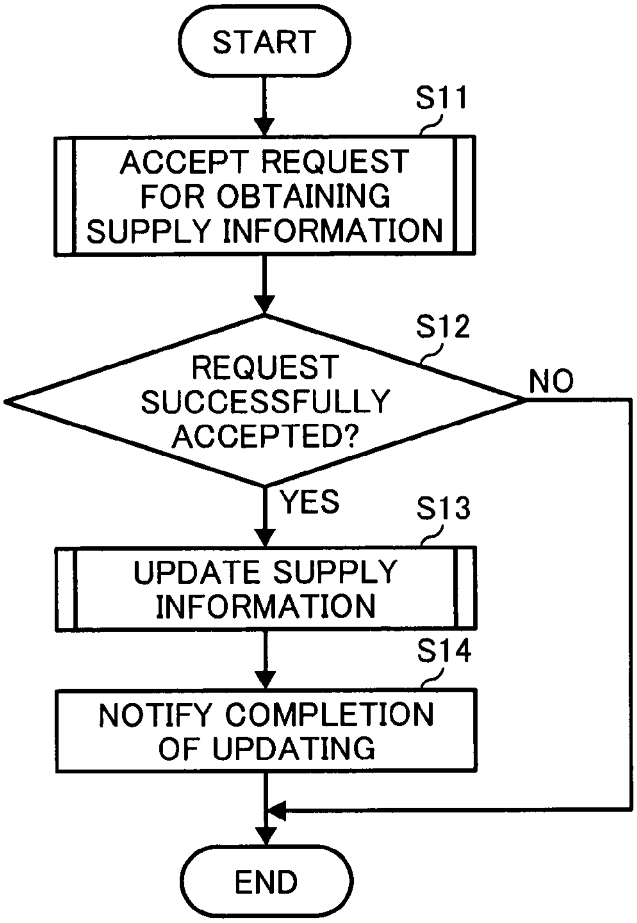
FIG. 14 is a flowchart illustrating operation of obtaining supply information according to an example embodiment of the present invention.
Figure 15:
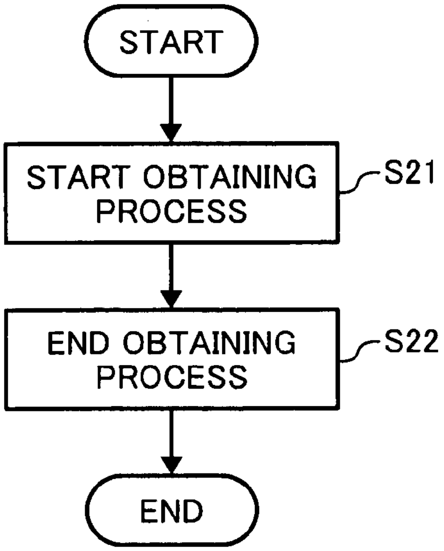
FIG. 15 is a flowchart illustrating operation of obtaining supply information according to an example embodiment of the present invention.

Referring now to any one of FIGS. 14 and 15, operation of obtaining supply information is explained according to an example embodiment of the present invention. As described above referring to FIG. 10, the operation of FIG. 14 may be performed by the CPU 11 according to the printer application program upon receiving a request for obtaining supply information from the outside of the system, for example, from the outside process 63 through the UIAPI 64, using the interprocess communication technique. The operation of FIG. 15 may be performed by the CPU 11 according to the printer application program upon receiving a request for obtaining supply information internally within the system, for example, from the internal print module 56, using the function call technique. In such case, the internal print module 56 may be created as a thread.

Referring to FIG. 14, S11 performs the process of accepting the request for obtaining supply information from the outside process 63. For example, the request may be accepted or not accepted by the request/response processor 51*a* of the information manager module 51 as described below referring to FIG. 16.

S12 determines whether the request for obtaining supply information is successfully accepted by the request/response processor 51*a* of the information manager module 51. S12 may be performed by the information obtainer 51*b* of the information manager module 51. If the request is successfully accepted ("YES" at S12), the operation proceeds to S13. If the request is not successfully accepted ("NO" at S12), the operation ends.

S13 updates the supply information in a substantially similar manner as described above referring to FIG. 13.

S14 notifies the request/response processor 51*a* that updating is completed, and the operation ends. Once notified, the request/response processor 51*a* may send the updated supply information to the outside process 63 in the form of response. Alternatively, the request/response processor 51*a* may send notification that updating is completed to the outside processor 63 to cause the outside processor 63 to obtain the supply information, which is updated, from the shared memory 58.

Referring to FIG. 15, upon receiving the request for obtaining supply information internally, S21 starts the process of obtaining the supply information. At this time, the internal print module 56 waits until updating of supply information, which may be performed in a substantially similar manner as described above referring to FIG. 13, is completed. Upon receiving a return value from the function, which includes the updated supply information, at S22, the internal print module 56 ends the process of obtaining the supply information.

Figure 16:
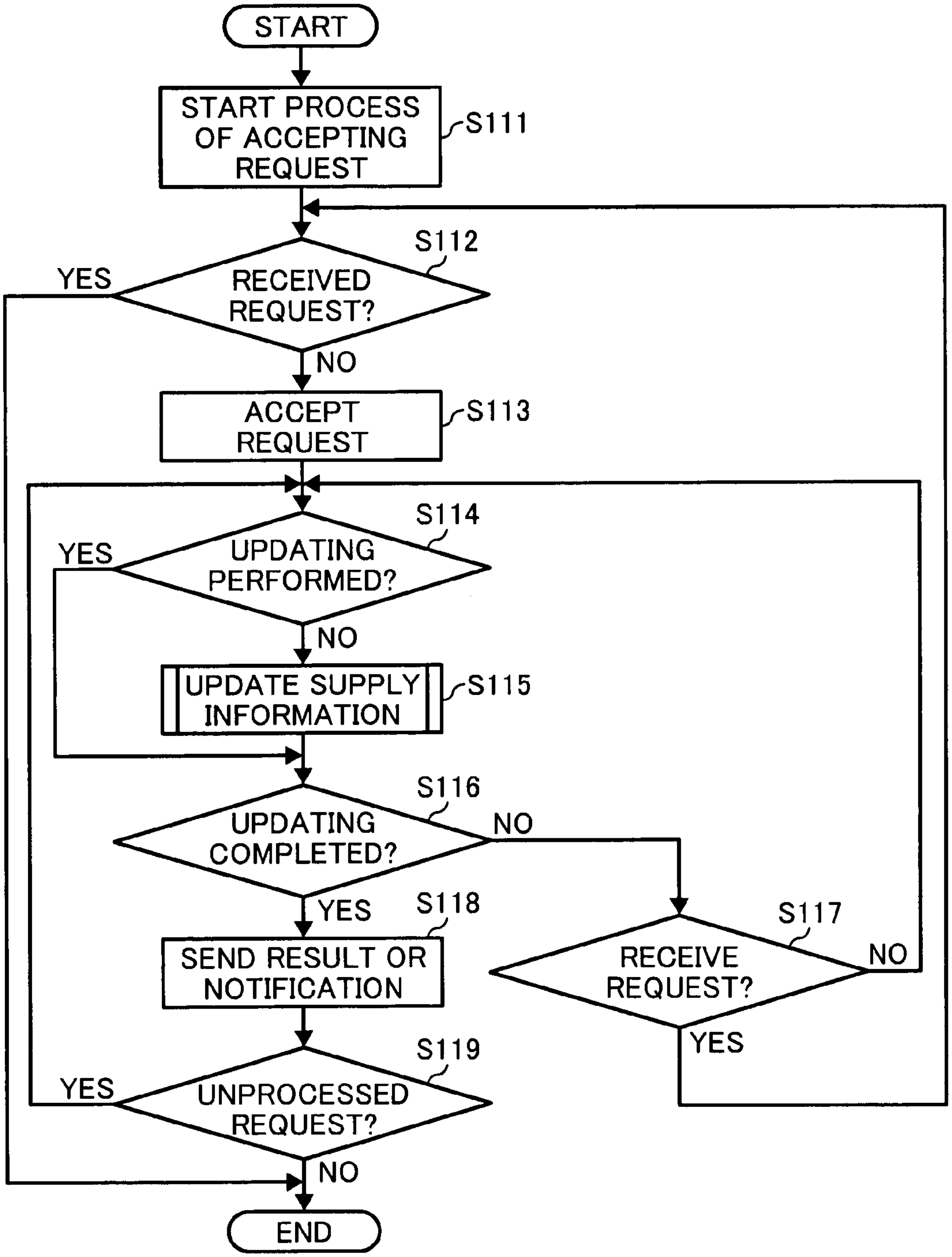
FIG. 16 is a flowchart illustrating operation of processing a request for obtaining supply information according to an example embodiment of the present invention.

Referring to FIG. 16, operation of accepting a request for obtaining supply information is explained according to an example embodiment of the present invention. The operation of FIG. 16 may be performed by the CPU 11 according to the printer application program at S11 of FIG. 14. Further, in this example, the request for obtaining supply information is assumed to be issued by a display module 63*a* of the outside process 63.

Upon receiving the request for obtaining supply information from the display module 63*a*, at S111, the request/response processor 51*a* of the information manager module 51 (FIG. 6) may start the process of accepting the request.

S112 determines whether a request for obtaining supply information has been received from the display module 63*a* before receiving the request received at S111, for example, by checking information stored in a request management table. The request management table stores identification information for identifying a request, and identification information for identifying a calling process that sends the request in a corresponding manner. If the request has been received from the display module 63*a* ("YES" at S32), the operation ends to proceed to S12 of FIG. 14. In such case, the request currently received is not accepted such that updating of the supply information is not performed. If the request has not been received from the display module 63*a* ("NO" at S112), the operation proceeds to S113.

S113 accepts the request for obtaining supply information. At this time, identification information for identifying the request, and identification information for identifying the calling process that has sent the request, i.e., the display module 63*a*, may be stored in the request management table.

S114 determines whether the process of updating supply information stored in the shared memory 58 is being performed. When the process of updating supply information is being performed ("YES" at S114), the operation proceeds to S116. When the process of updating supply information is not being performed ("NO" at S114), the operation proceeds to S115.

S115 starts the process of updating supply information, which may be performed in a substantially similar manner as described above referring to FIG. 13.

S116 determines whether the process of updating supply information is completed. If the process of updating supply information is completed ("YES" at S116), the operation proceeds to S118. If the process of updating supply information is not completed ("NO" at S116), the operation proceeds to S117.

S117 determines whether a request for obtaining supply information is received from the outside process 63. When it is determined that the request is received ("YES" at S117), the operation returns to S112 to repeat S112 to determine whether the request received at S117 has been received from the display module 63*a*, for example, by checking the identification information stored in the request management table. When it is determined that the request is not received ("NO" at S117), the operation returns to S114. For example, when the request detected at S117 is issued by the display module 63*a*, the request detected at S117 is not accepted. In this manner, the number of requests issued by the same process or module may be suppressed or limited to one at a time. Alternatively, when the request detected at S117 is issued by different processes or modules, or different terminals 3, the request detected at S117 is accepted to register the request in the request management table.

S118 sends the updated supply information to the display module 63*a* in response to the request received at S111. Alternatively, S118 may send notification that updating is completed.

S119 determines whether there is one or more unprocessed requests by checking information stored in the request management table. If it is determined that there is one or more unprocessed requests, the operation returns to S114. If it is determined that there is no unprocessed request, the operation ends.

The operation of FIG. 16 may be performed in various other ways. For example, when S117 determines that no request is received ("NO" at S117), the operation may return to S116. In another example, when S119 determines that there is one or more unprocessed requests ("YES" at S119), the operation may return to S118 to send the updated supply information obtained at S115 to the one or more unprocessed requests. Further, in this example, a plurality of requests stored in the request management table may be processed in the order of entry.

Figure 17:
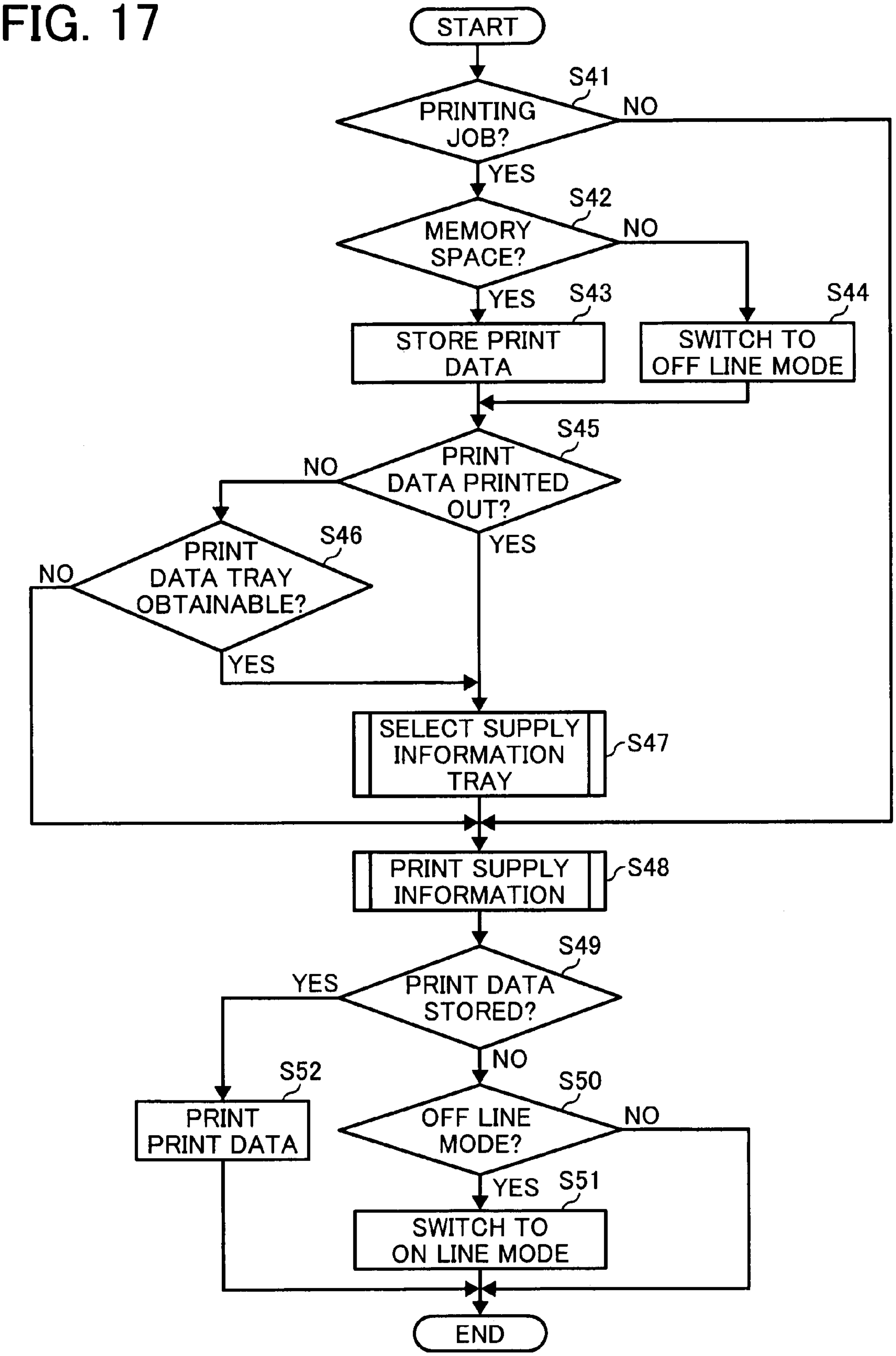
FIG. 17 is a flowchart illustrating operation of printing supply information according to an example embodiment of the present invention.

Referring to FIG. 17, operation of printing supply information is explained according to an example embodiment of the present invention. The operation of FIG. 17 may be performed by the CPU 11 according to the printer application program upon receiving the request for printing supply information. For example, the operation panel 31 of the printer 1 may display the screen illustrated in FIG. 18. When the "supply information list" is selected from the screen of FIG. 18 by the user, the printer 1 determines that the request for printing supply information is received.

S41 determines whether a printing job is currently being performed by the printer engine 30. S41 may be performed by the plotter manager 52*b* of the system manager module 52 (FIG. 6). If no printing job is performed ("NO" at S41), the operation proceeds to S48. If a printing job is performed ("YES" at S41), the operation proceeds to S42.

S42 determines whether a memory space is available, for example, by checking the HDD 17 or the RAM 16. If the memory space is available ("YES" at S42), the operation proceeds to S43. If memory space is not available ("NO" at S42), the operation proceeds to S44.

S43 interrupts the printing job currently performed. At this time, print data to be printed according to the printing job may be stored in a data spool area of the HDD 17 or RAM 16. When the data spool area becomes full, the operation may proceed from S43 to S44.

S44 interrupts the printing job currently performed, and switches the printer 1 from the on-line mode to the off-line mode to prevent the printer 1 from receiving additional print data.

S45 determines whether any portion of the print data has been printed out onto a tray as a toner image. If the print data has been printed out ("YES" at S45), the operation proceeds to S47. If the print data has not been printed out ("NO" at S45), the operation proceeds to S46.

S47 obtains information regarding the tray to which the print data is printed out, and selects a tray ("supply information tray") to which a recording sheet having the supply information is to be printed out. For example, S47 may be performed in a manner described below referring to FIG. 19.

S46 determines whether information regarding the tray to which the print data is printed out is obtainable. When it is determined that such information regarding the tray outputting the print data is obtainable ("YES" at S46), the operation proceeds to S47. When it is determined that information regarding the tray outputting the print data is not obtainable ("NO" at S46), the operation proceeds to S48 without selecting the supply information tray such that the supply information tray will be automatically set to a default tray.

S48 prints the supply information, for example, as described below referring to FIG. 21.

S49 determines whether the print data to be printed has been stored in the data spool area at S43. When it is determined that the print data to be printed has been stored ("YES" at S49), the operation proceeds to S52 to print the print data, and the operation ends. When it is determined that no print data has been stored ("NO" at S49), the operation proceeds to S50 to check the mode of the printer 1.

When the printer 1 is in the off-line mode ("YES" at S50), the operation proceeds to S51 to switch from the off-line mode to the on-line mode to continue receiving the print data. When the printer 1 is in the on-line mode ("NO" at S50), the operation ends.

As described above referring to FIG. 17, since the printing job may be interrupted while the supply information is printed out, the user may be notified the amount or status of the supply before completing the printing job. For example, the user may be able to cancel the printing job when the supply information indicates that the supply is in the end state. In this manner, the quality of the printed image may be kept high.

Figure 19:
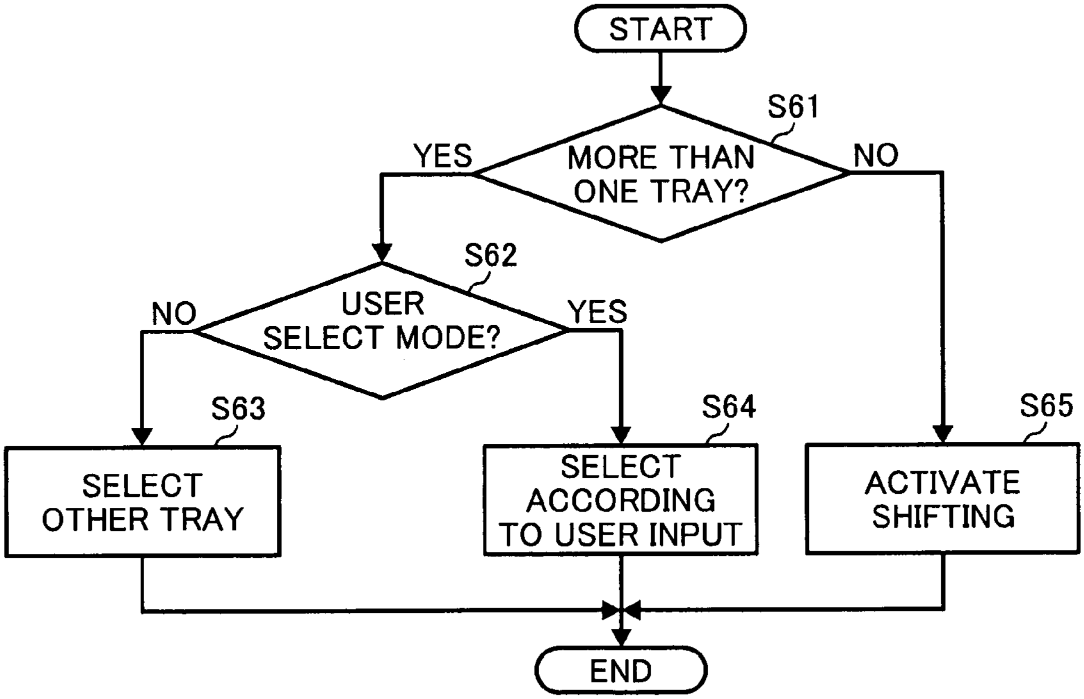
FIG. 19 is a flowchart illustrating operation of selecting a supply information tray according to an example embodiment of the present invention.

Referring to FIG. 19, operation of selecting the supply information tray is explained according to an example embodiment of the present invention. The operation of FIG. 19 may be performed by the CPU 11 according to the printer application program at S47 of FIG. 17.

S61 determines whether more than one tray is available to the printer 1. When there is only one tray available ("NO" at S61), the operation proceeds to S65. When there is more than one tray available ("YES" at S61), the operation proceeds to S62.

S65 selects a default tray as the supply information tray, and activates a shifting function that causes the printer 1 to discharge a recording sheet having the supply information on the default tray such that the edge of the recording sheet is shifted relative to the edge of a recording sheet having the print data. In this manner, the user may easily recognize that the supply information is output even when the supply information is discharged onto the same tray to which the print data is discharged.

S62 determines whether a user select mode is selected, for example, by referring to the tray information stored in a nonvolatile memory of the printer 1 as the print settings information. For example, the user may previously select the user select mode, which allows the user to select a supply information tray, through the operation panel 31, or the input device of the host apparatus 40 or the terminal 3. When the user select mode is selected ("YES" at S62), the operation proceeds to S64. When the user select mode is not selected ("NO" at S62), the operation proceeds to S63.

Figure 20:
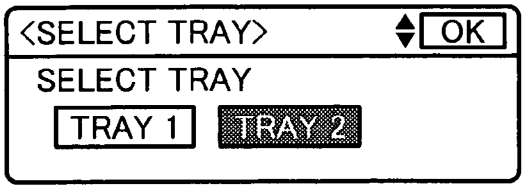
FIG. 20 is an illustration of an example screen displayed by the image forming apparatus shown in FIG. 2.

S64 allows the user to select a supply information tray by displaying a request for selecting one of the trays available to the printer 1 on the operation panel 31, or the output device of the host apparatus 40 or the terminal 3. For example, the operation panel 31 may display a screen illustrated in FIG. 20 to allow the user to select one of the trays as the supply information tray.

S65 automatically selects a tray other than the tray for outputting the print data as the supply information tray.

The operation of FIG. 19 may be performed in various other ways. For example, in alternative or addition to the above-described options, the printer 1 may provide the user with the option of printing the supply information on a recording sheet having the type different from the type of the recording sheet having the print data. In this manner, the user may easily recognize that the supply information is printed out.

Figure 21:
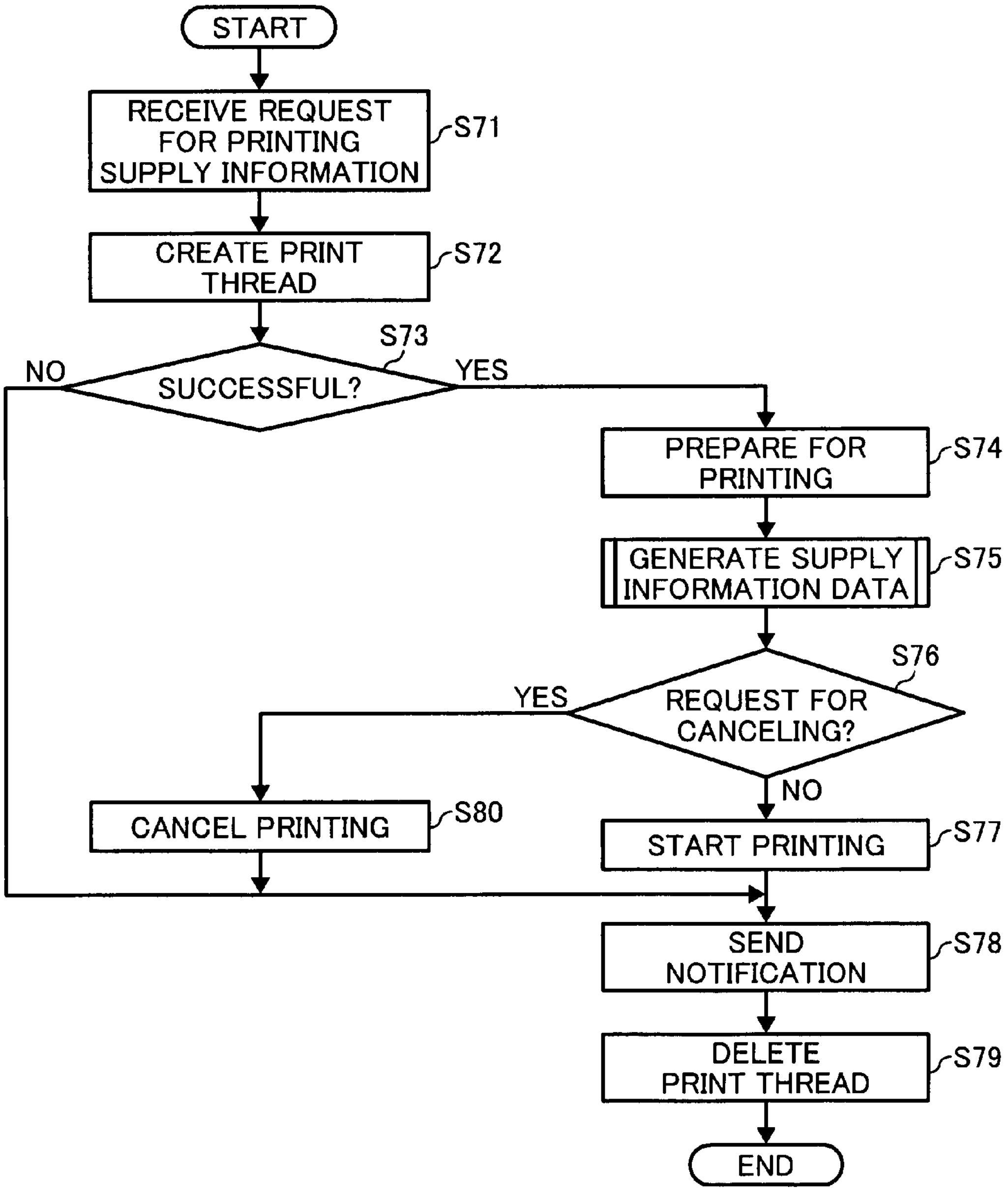
FIG. 21 is a flowchart illustrating operation of printing supply information according to an example embodiment of the present invention.

Referring now to FIG. 21, operation of printing supply information is explained according to an example embodiment of the present invention. The operation of FIG. 21 may be performed by the CPU 11 according to the printer application program at S48 of FIG. 17.

S71 receives the request for printing supply information. For example, the system management module 52 (FIG. 6) may receive the request from the outside process 63 through the UIAPI 64.

S72 creates a print thread. In this example, the internal print module 56 may function as the print thread.

S73 determines whether the print thread is successfully created. If the print thread is successfully created ("YES" at S73), the operation proceeds to S74 to cause the internal print module 54 to start the process of printing. If the print thread is not successfully created ("NO" at S73), the operation proceeds to S78.

S74 performs printing preparation including, for example, selection of a supply information tray, generation of a flame, or setting various printing conditions.

S75 generates data ("supply information data") to be printed, which includes the supply information. For example, the internal print module 56 (FIG. 6) may generate the supply information data using the supply information, which may be obtained through the character data obtainer 74 and the print data obtainer 75 (FIG. 7) in a substantially similar manner as described above referring to FIG. 15. In this example, the supply information data may additionally include header data, which may include time information obtained in a manner described below referring to FIG. 23. The time information, which indicates the current date and/or time, may help the user to manage the supply information. For example, by checking the time information, the user may be able to estimate the degree of usage of the supply or timing when a new supply should be ordered.

S76 determines whether a request for canceling printing of the supply information is received from the user, for example, by referring to the print settings information that may be stored in a nonvolatile memory such as the RAM 16. Such information indicating whether to cancel printing may be written as flag information. When it is determined that the request for canceling is not received ("NO" at S76), the operation proceeds to S77 to start printing the supply information. When it is determined that the request for canceling is received ("YES" at S76), the operation proceeds to S80 to cancel printing of the supply information.

Figure 22A:
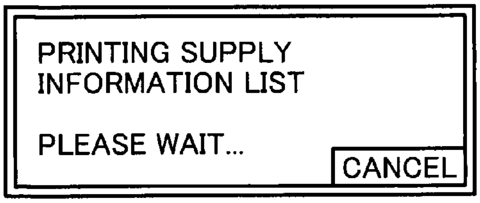
FIG. 22A is an illustration of an example screen displayed by the image forming apparatus shown in FIG. 2.
Figure 22B:
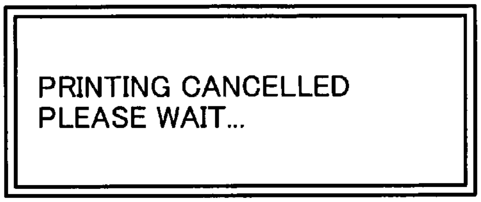
FIG. 22B is an illustration of an example screen displayed by the image forming apparatus shown in FIG. 2.

Alternatively, at S76, the printer 1 may display a screen illustrated in FIG. 22A on the operation panel 31, which includes a button that allows the user to cancel printing of the supply information while performing the printing operation. Upon detecting user selection of the cancel button, the printer 1 may cancel printing of the supply information, while switching the display of the operation panel 31 from the screen of FIG. 22A to a screen of FIG. 22B.

When printing is completed at S77, S78 sends notification to the outside process 63 that the printing process is completed. Alternatively, when printing is cancelled at S80, S78 may send notification that printing is cancelled. Alternatively, when printing fails due to the error in creating the print thread ("NO" at S73), S78 may send notification that an error is generated.

S79 deletes the print thread, and the operation ends.

Figure 23:
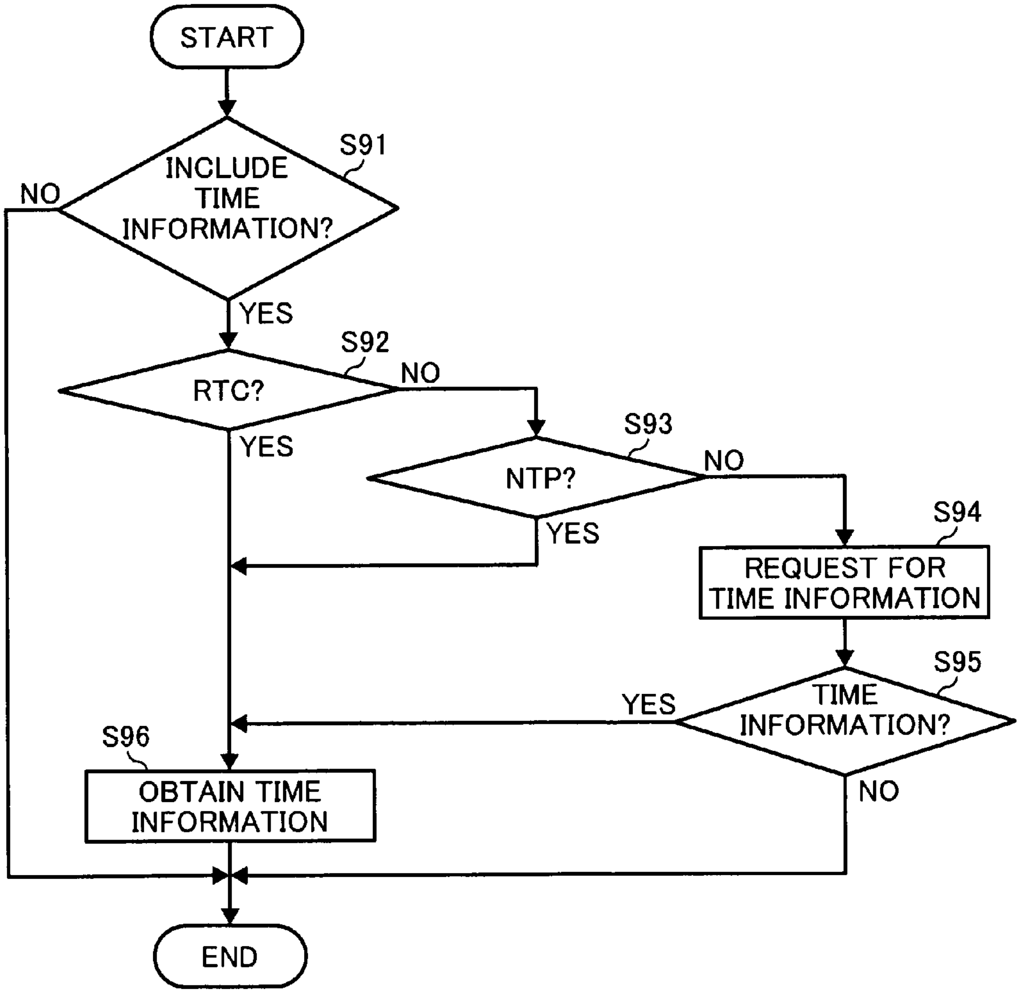
FIG. 23 is a flowchart illustrating operation of obtaining time information according to an example embodiment of the present invention.

Referring to FIG. 23, operation of obtaining time information to be included in the header data of the supply information data is explained according to an example embodiment of the present invention. The operation of FIG. 23 may be performed by the internal print module 56 at S75 of FIG. 21.

S91 determines whether to include time information in the header data, for example, by referring to the print settings information. When it is determined to include the time information ("YES" at S91), the operation proceeds to S92. When it is determined not to include the time information ("NO" at S91), the operation ends.

S92 determines whether a real time clock (RTC) circuit, such as a timer, is available to the printer 1 to obtain the time information. When the RTC is available ("YES" at S92), the operation proceeds to S96. When the RTC is not available ("NO" at S92), the operation proceeds to S93.

S93 determines whether a network time protocol (NTP) is available. When the NTP is available ("YES" at S93), the operation proceeds to S96. When the NTP is not available ("NO" at S93), the operation proceeds to S94.

Figure 24:
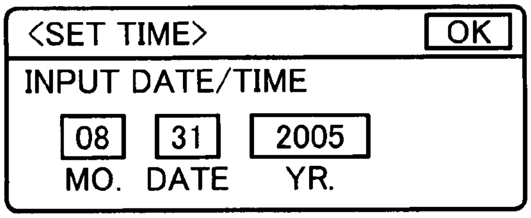
FIG. 24 is an illustration of an example screen displayed by the image forming apparatus shown in FIG. 2.

S94 requests the user to input the time information, through the operation panel 31 or the display device of the host apparatus 40 or the terminal 3. For example, the operation panel 31 may display a screen illustrated in FIG. 24, which requests the user to input the current date and time.

S95 determines whether the time information is input. When it is determined that the time information is input ("YES" at S95), the operation proceeds to S96. When it is determined that the time information is not input ("NO" at S95), the operation ends to proceed to S76 of FIG. 21. In such case, the time information is not included in the header data. Alternatively, when it is determined that the time information is not input ("NO" at S95), the operation may repeat S95.

S96 obtains the time information, which indicates a current date and/or time, to be included in the header data, and the operation ends to proceed to S76 of FIG. 21.

Figure 25:
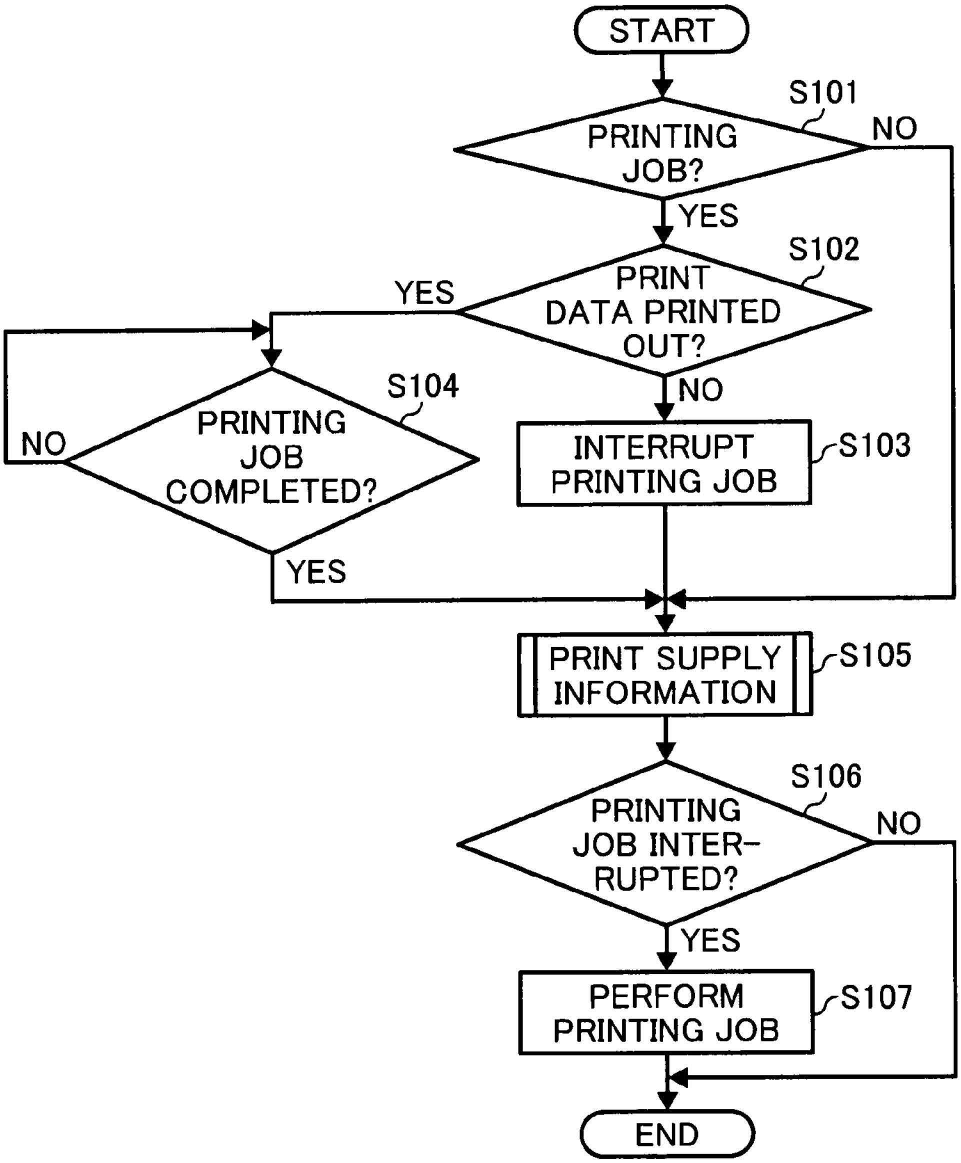
FIG. 25 is a flowchart illustrating operation of printing supply information according to an example embodiment of the present invention.

Referring now to FIG. 25, operation of printing supply information is explained according to an example embodiment of the present invention. The operation of FIG. 25 may be performed by the CPU 11 according to the printer application program, for example, upon receiving a request for printing supply information.

S101 determines whether a printing job is currently being performed by the printer engine 30, in a substantially similar manner as described above referring to S41 of FIG. 17. If no printing job is performed ("NO" at S101), the operation proceeds to S105. If a printing job is performed ("YES" at S101), the operation proceeds to S102.

S102 determines whether any portion of the print data has been printed out onto a tray according to the printing job. If the print data has been printed out ("YES" at S102), the operation proceeds to S104 to determine whether the printing job is completed. If it is determined that the printing job is completed ("YES" at S104), the operation proceeds to S105. If it is determined that the printing job is not completed ("NO" at S104), the operation repeats S104.

At S102, if the print data has not been printed out according to the printing job ("NO" at S102), the operation proceeds to S103 to interrupt the printing job. At this time, the print data may be stored in a spool data area as described above referring to S43 of FIG. 17.

S105 prints the supply information, for example, as described above referring to FIG. 21.

S106 determines whether the printing job is interrupted at S103. When it is determined that the printing job is interrupted ("YES" at S106), the operation proceeds to S107 to resume the printing job. When it is determined that the printing job is not interrupted ("NO" at S106), the operation ends. S107 may be performed upon receiving a user instruction for resuming the printing job. Alternatively, S107 may be performed after a predetermined time period passes after printing the supply information.

As described above referring to FIG. 25, since the supply information is printed after completion of the printing job currently performed if the print data is printed out onto a tray, the recording sheet having the supply information may be prevented from being mixed with the recording sheet having the print data.

The above-described operation of printing supply information illustrated in FIG. 17 or 25 may be performed in various other ways. For example, before interrupting the printing job currently performed at S42 of FIG. 17 or S103 of FIG. 25, the printer 1 may allow the user to select whether to interrupt the printing job, for example, by displaying a selection key on the operation panel 31, or the display device of the host apparatus 40 or the terminal 3.

In another example, before starting the operation of printing supply information upon receiving the request, such as before S41 of FIG. 17 or S101 of FIG. 25, the printer 1 may determine whether the user currently logged onto the system is authorized to print the supply information.

In one example, printer 1 may perform user authentication described below referring to S151 to S153 of FIG. 26, when the access restriction information, which is stored as the print settings information, indicates to restrict access to the supply information. The access restriction information may be stored in a nonvolatile memory, for example, as flag information. When the authentication process determines that the user is allowed to access supply information, the supply information may be printed in a substantially similar manner described above referring to FIG. 17 or 25.

Figure 26:
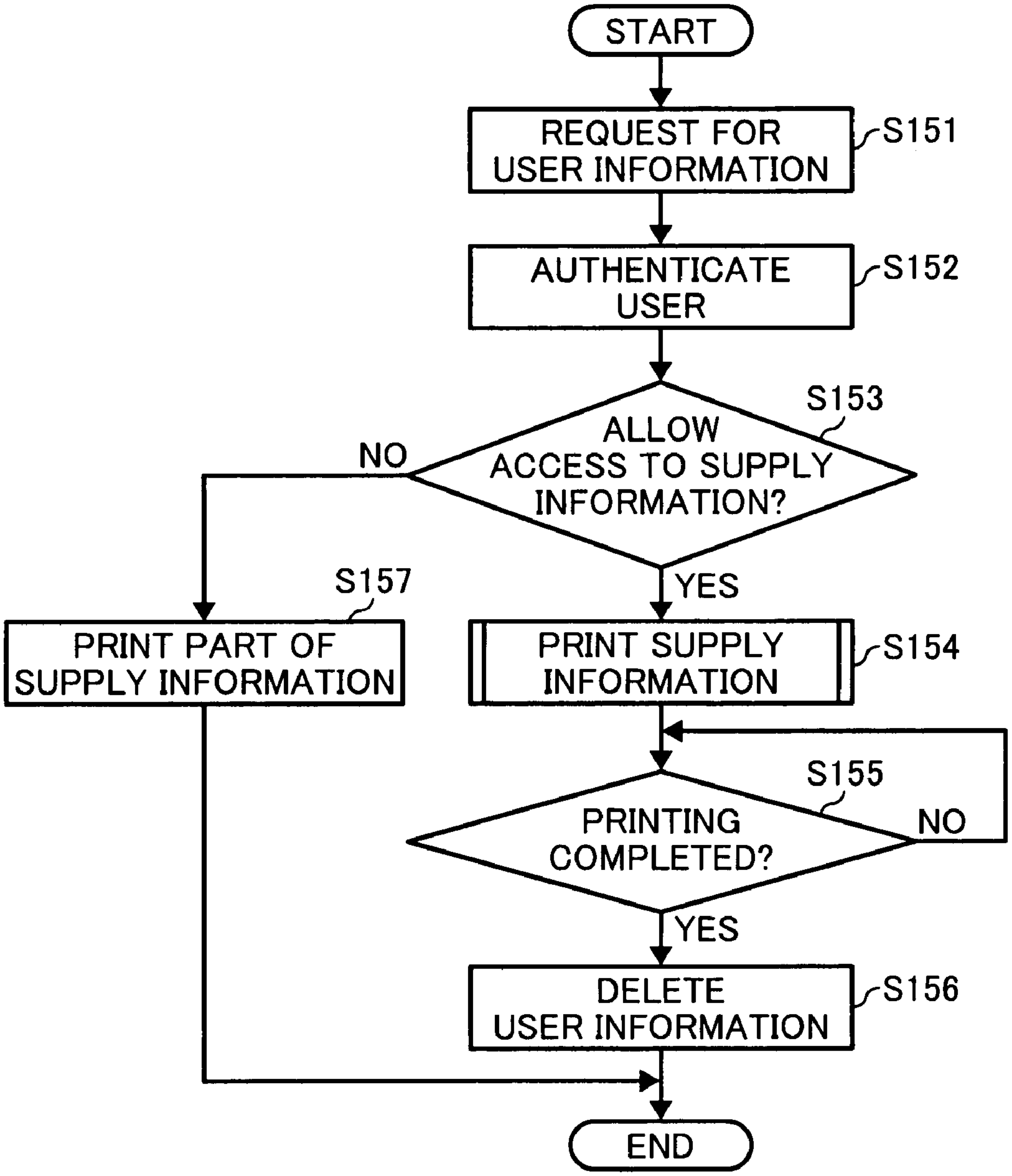
FIG. 26 is a flowchart illustrating operation of authenticating a user and printing supply information according to an example embodiment of the present invention.

Alternatively, the operation of S151 and S152 of FIG. 26 may be performed before interrupting the printing job, such as before S103 of FIG. 25. When the authentication process determines that the user is allowed to access supply information, the supply information may be printed while interrupting the printing job in a substantially similar manner described above referring to FIG. 25. When the authentication process determines that the user is not allowed to access supply information, the interrupted printing job may resume.

Referring to FIG. 26, operation of printing supply information when access to the supply information is restricted is explained according to an example embodiment of the present invention.

Figure 27A:
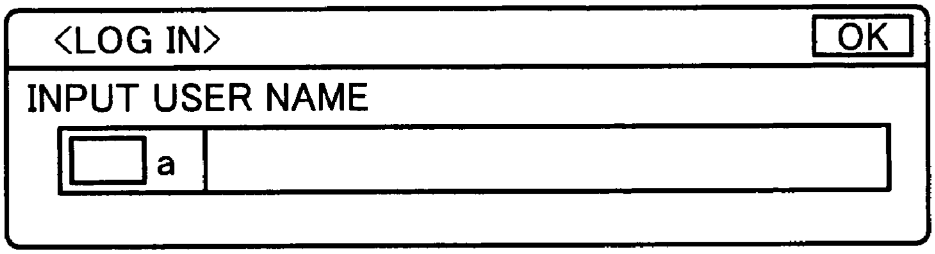
FIGS. 27A to 27C are illustration of example screens displayed by the image forming apparatus shown in FIG. 2.
Figure 27B:
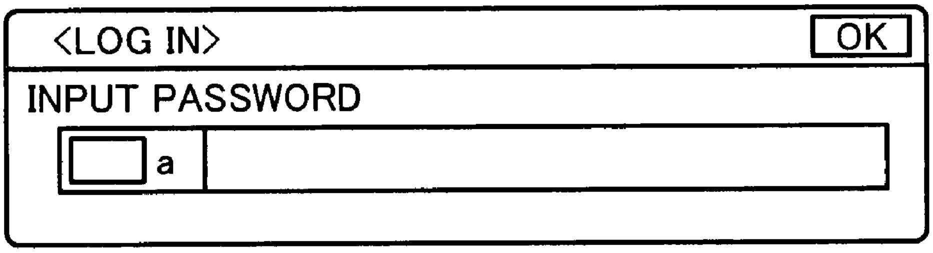
Figure 27C:
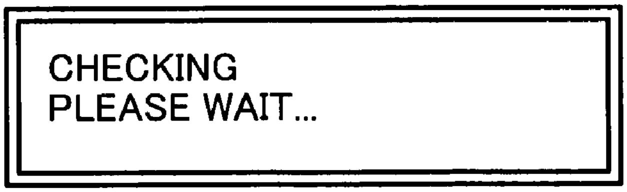

S151 requests the user to input user information, such as a user name and a password, through the operation panel 31 or the display device of the host apparatus 40 or the terminal 3. For example, the printer 1 may display a screen illustrated in FIG. 27A to request the user to input the user name. Upon detecting the user input, the printer 1 may display a screen illustrated in FIG. 27B to request the user to input the password. Upon detecting the user input, the operation proceeds to S152 to start the process of authenticating the user using the user name and the password. At this time, the printer 1 may display a screen illustrated in FIG. 27C. In this example, the supply information and the print settings information may be prepared for each one of a first user group who has access to supply information and a second user group who does not have access to supply information. For the descriptive purpose, the first user group and the second user group may be respectively referred to as an administrator and a general user. Using the user information, the CPU 11 determines whether the user currently logged onto the system is the administrator or the general user.

S153 determines whether the user has access to supply information according to the result generated at S153. When it is determined that the user has access to supply information, i.e., the user is the administrator ("YES" at S153), the operation proceeds to S154 to print supply information in a substantially similar manner as described above referring to FIG. 17 or 25. When it is determined that the user does not have access to supply information, i.e., the user is the general user ("NO" at S153), the operation proceeds to S157.

S155 determines whether printing of the supply information is completed. When it is determined that printing is completed ("YES" at S155), the operation proceeds to S156. When it is determined that printing is not completed ("NO" at S155), the operation repeats S155. Additionally, S155 may determine whether the current printing job, which may be interrupted due to printing of the supply information, is completed after it is determined that printing of the supply information is completed.

S156 deletes user information input at S151, and the operation ends. Alternatively, S156 may automatically log off the user. By deleting the user information of the administrator, the supply information that can be accessed only by the administrator may be prevented from being printed by the general user even when the administrator accidentally forgets to log off from the system. S156 may be performed at any timing after S155.

When the user is the general user, at S157, the printer 1 may print a selected part of the supply information, and the operation ends. Before ending the operation, any interrupted printing job may be performed. For example, the selected part of the supply information may contain information that can be disclosed to the general user, which may be previously set by the administrator. In another example, the selected part of the supply information may contain information that all users need to know, such as notification that the supply is in the end state. The selected part of the supply information may be managed by using the print/unprint information.

The operation of FIG. 26 may be performed in various other ways. For example, in alternative to printing the supply information at S154, the printer 1 may allow the user to select whether to print the supply information, for example, by displaying a selection key on the operation panel 31 or the display device of the host apparatus 40 or the terminal 3.

Figure 28:
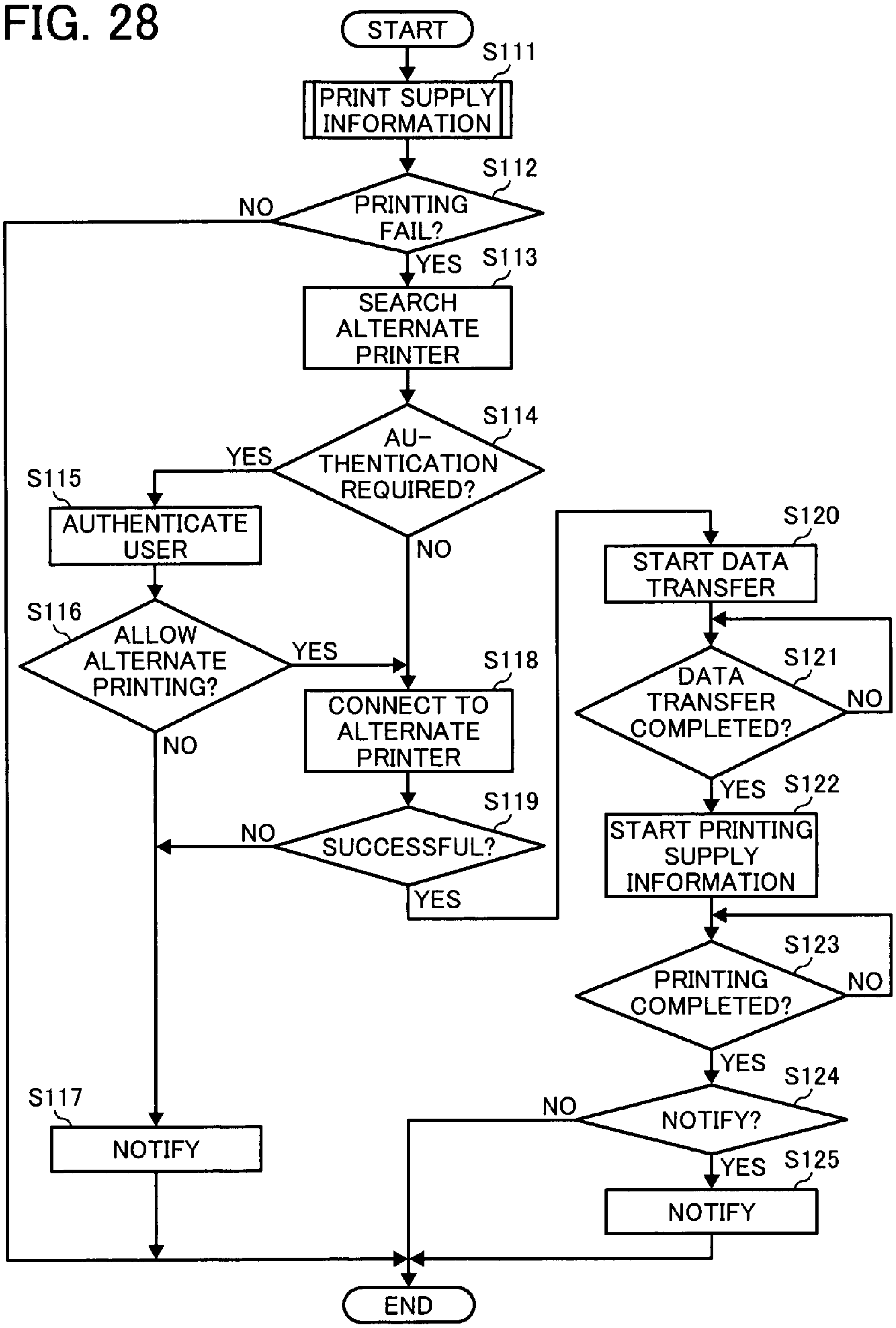
FIG. 28 is a flowchart illustrating operation of printing supply information using an alternate image forming apparatus according to an example embodiment of the present invention.

In alternative to printing the supply information using the printer 1, in another example, the supply information may be printed out using an alternate printer other than the printer 1 as long as the alternate printer is connected to the printer 1 via a network, such as via the LAN 2 of FIG. 1. Referring to FIG. 28, operation of printing supply information using the alternate printer is explained according to an example embodiment of the present invention. The operation of FIG. 28 may be performed after performing the process of printing supply information described referring to FIG. 21, which may be performed at S48 of FIG. 17 or S105 of FIG. 25.

After performing the process of printing the supply information at S111 in a substantially similar manner as described above referring to FIG. 21, S112 determines whether printing of the supply information fails, for example, by checking the printer engine 30. If it is determined that printing fails ("YES" at S112), for example, due to an error in the printer 1, the operation proceeds to S113. If it is determined that printing does not fail, i.e., printing is successfully performed ("NO" at S112), the operation ends. In such case, the supply information is printed by the printer 1.

S113 searches for an alternate printer available for use. For example, the printer 1 may refer to an alternate printer table storing one or more alternate printers, and select one printer from the alternate print table as the alternate printer. Selection may be made based on the availability of the alternate printer such that the alternate printer, which is not currently performing a printing job, may be selected. Alternatively, the alternate printer, which is located near the printer 1 or near the administrator of the printer 1, may be selected. In another example, the printer 1 may inquire one or more printers exited on the network, for example, when the alternate printer table is not available.

S114 determines whether user authentication is required for the user to print supply information using the alternate printer, for example, by referring to the access restriction information set for the alternate printer. When it is determined that access is restricted, the operation proceeds to S115 to start the process of authenticating the user, for example, in a manner described above referring to S151 to S153 of FIG. 26. S116 determines whether to allow the user to print supply information using the alternate printer based on the result obtained at S115. When the authentication process of S115 determines that the user is allowed to print using the alternate printer ("YES" at S116), the operation proceeds to S118. When the authentication process of S115 determines that the user is not allowed to print using the alternate printer ("NO" at S116), the operation proceeds to S117. S117 notifies the user that printing of the supply information is not performed, for example, by displaying a notification message or an error message on the operation panel 31 or the display device of the host apparatus 40 or the terminal 3. Alternatively, S117 may allow the user to print a selected part of the supply information in a substantially similar manner as described above referring to S157 of FIG. 26.

When it is determined that access is not restricted for the alternate printer, or the authentication process determines that the user is allowed to print using the alternate printer, the operation proceeds to S118 to connect the printer 1 to the alternate printer.

S119 determines whether connection is successfully established. When it is determined that connection is successfully established ("YES" at S119), the operation proceeds to S120 to start transferring the supply information data to the alternate printer. When it is determined that data transfer is completed ("YES" at S121), the operation proceeds to S122 to cause the alternate printer to start printing a supply information list including the supply information obtained from the printer 1. In this example, the supply information list may additionally include information regarding the printer 1, such as the identification information of the printer 1. Such identification information may be printed in the header.

When it is determined that printing of the supply information is completed ("YES" at S123), the operation proceeds to S124 to determine whether notification is required. When it is determined that notification is required ("YES" at S124), the operation proceeds to S125 to notify the printer 1 that printing is completed. Alternatively, at S125, the alternate printer may notify a selected user, such as an administrator, that printing of the supply information is completed. In such case, the alternate printer may send an email including a notification message to the selected user. The notification message may include information regarding the printer 1 that requests the alternate printer to print the supply information, and information regarding the alternate printer that actually prints the supply information.

The operation of FIG. 28 may be performed in various other ways. For example, before searching for the alternate printer at S113, the printer 1 may determine whether alternate printing is available for use, for example, by referring to the alternate printing activation information. The alternate printing activation information may be stored as the print settings information in the form of flag information. When the alternate printing is activated, the printer 1 may connect to the alternate printer to print supply information. In such case, the operation may proceed to S113. When the alternate printing is not activated, the printer 1 does not connect to the alternate printer to print supply information. In such case, the operation ends.

In another example, before searching for the alternate printer at S113, the printer 1 may determine whether alternate printing is restricted, for example, by referring to the alternate printing restriction information indicating whether to allow the user to connect to the alternate printer. The alternate printing restriction information may be stored in a nonvolatile memory, for example, as flag information. When the alternative printing restriction information indicates to allow alternate printing, the printer 1 may perform the user authentication process as described above referring to S151 to S153 of FIG. 26. When the authentication process determines that the user is allowed to use the alternate printer, the operation may proceed to S113 to search for the alternate printer. In such case, the authentication process performed to determine whether the user has access to the supply information, which may correspond to S114, S115, and S116, may not be performed. When the authentication process determines that the user is not allowed to use the alternate printer, the operation proceeds to S117.

In another example, when it is determined that connection fails at S119 ("NO" at S119), the operation may return to S113 to search for an alternate printer other than the alternate printer previously selected at S113.

Figure 29:
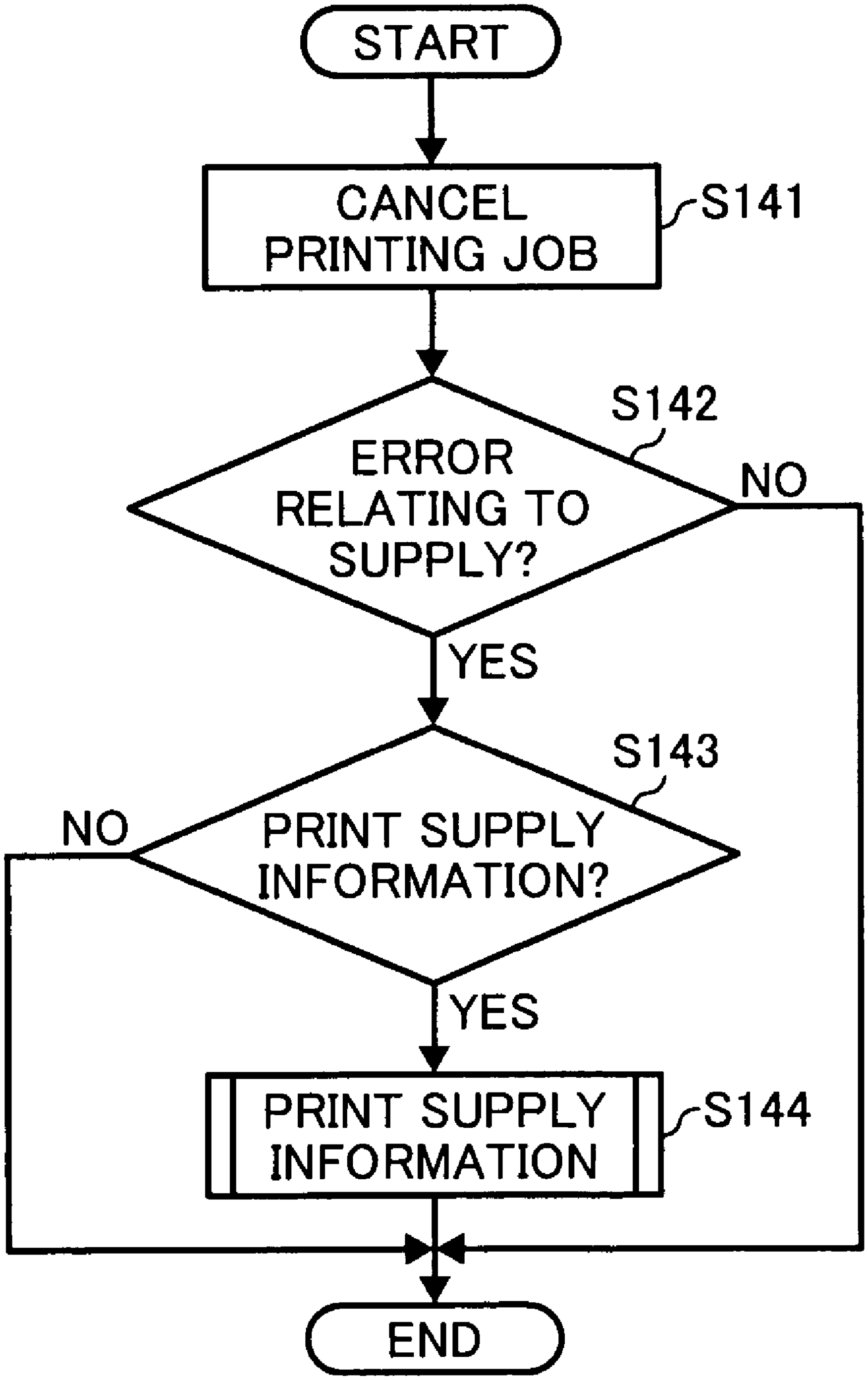
FIG. 29 is a flowchart illustrating operation of printing supply information when an error is detected in the image forming apparatus shown in FIG. 2 according to an example embodiment of the present invention.

As described above, the supply information may be printed at any desired timing. Referring to FIG. 29, operation of printing supply information when an error is detected in the printer 1 is explained according to an example embodiment of the present invention.

S141 cancels a printing job that may be currently performed by the printer engine 30.

S142 determines whether the error detected in the printer 1 relates to the supply of the image forming device. When it is determined that the error relates to the supply ("YES" at S142), the operation proceeds to S143. When it is determined that the error does not relate to the supply ("NO" at S142), the operation ends.

S143 determines whether printing of the supply information when the error is detected is required, for example, by referring to the print settings information indicating whether to print the supply information at the time when an error is generated, such as the error print/unprint information. When it is determined that printing is required ("YES" at S143), the operation proceeds to S144 to print the supply information, for example, in a substantially similar manner as described above referring to FIG. 21. When it is determined that printing is not required ("NO" at S143), the operation ends.

The operation of FIG. 29 may be performed in various other ways. For example, the printer 1 may be set to automatically print the supply information when the error relating to the supply is detected by assignation a predetermined value to the error print/unprint information. In another example, the print settings information indicating whether to require printing may be stored independently for each one of the selected number of supplies. For example, the error print/unprint information indicating whether to print the supply information at the time of error may be stored for each one of the selected number of supplies. In another example, instead of referring to the printing settings information to determine whether to print the supply information, the printer 1 may allow the user to select whether to print, for example, by displaying a selection key on the operation panel 31 or the display device of the host apparatus 40 or the terminal 3 when the error is detected.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

In another example, any one of the above-described functions or operations may be performed by the printer 1 may be partially performed by a supply information manager. For example, the supply information manager may be implemented by any desired information processing apparatus, such as a general-purpose computer including a processor. In such case, the processor of the supply information manager may perform a desired operation according to the printer application program described above referring to FIG. 6 or 7. Referring to FIG. 1, assuming that the terminal 3*a* functions as the supply information manager, the terminal 3*a* receives supply information from each one of the plurality of image forming apparatuses 1*a*, 1*b*, 1*c*, and 1*d* (collectively referred to as the "image forming apparatus 1"), and stores the supply information in a corresponding manner with identification information of the image forming apparatus 1. Additionally, the terminal 3*a* may store display settings information. At predetermined timing, the terminal 3*a* may generate a supply information list including the supply information being stored according to print settings information, and causes the image forming apparatus 1 to print the supply information list on a recording sheet. The image forming apparatus 1 for printing the supply information list may be selected by the terminal 3, for example, in a substantially similar manner as described above referring to S13 of FIG. 28.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image forming apparatus, comprising:

an image forming device configured to print image data on a recording sheet using a printer supply;

a detector configured to detect supply information of the printer supply; and a controller configured to store the supply information detected by the detector, generate a supply information list including the supply information according to print settings information regarding the supply information list, the print settings information being changeable according to user preference, and print the supply information list on a recording sheet, wherein the supply information is updated, and the controller is further configured to obtain updated supply information, convert the updated information into a form determined by the print settings information to generate an updated supply information list, and print the updated supply information list on a recording sheet to reflect the change in supply information caused by updating.

2. The apparatus of claim 1, wherein the controller is further configured to interrupt an image forming job being currently performed by the image forming device to cause the image forming device to print the supply information list before completing the image forming job.

3. The apparatus of claim 2, wherein the controller is further configured to select a position or location at which the recording sheet having the supply information list is discharged.

4. The apparatus of claim 2, wherein the controller is further configured to authenticate a user using information input by the user to generate an authentication result, and allow the user to interrupt the image forming job being currently performed by the image forming device when the authentication result indicates that the user has access to the supply information.

5. The apparatus of claim 1, wherein the controller is further configured to authenticate a user to generate an authentication result before printing the supply information, and wherein the supply information to be included in the supply information list is limited in contents when the authentication result indicates that the user does not have access to the supply information.

6. The apparatus of claim 1, further comprising:

a network interface configured to connect the apparatus with an alternate image forming apparatus via a network, wherein the supply information list is printed by at least one of the image forming apparatus and the alternate image forming apparatus.

7. The apparatus of claim 6, wherein the controller is further configured to authenticate a user to generate an authentication result, and wherein the supply information list is printed by the alternate image forming apparatus when the authentication result indicates that the user has access to the supply information or the user is allowed to perform alternate printing.

8. The apparatus of claim 1, wherein the controller is further configured to determine, when an error is detected, whether the error is caused by the supply of the image forming device to generate a determination result, and print the supply information list when the determination result indicates that the error is caused by the supply.

9. The apparatus of claim 1, wherein the controller is further configured to determine whether the supply is in at least one of a near end state, an end state, and an illegitimate state from the updated supply information to generate a determination result, and print the updated supply information list when the determination result indicates that the supply is in at least one of the near end state, the end state, and the illegitimate state.

10. The image forming apparatus of claim 1, wherein the image forming device is further configured to display the supply amount information in the updated supply information list to reflect a step-by-step change in supply amount information caused by updating, wherein the supply information includes supply amount information that indicates at least one of the degree of usage of the image forming device, the remaining life time of the image forming device, the amount of consumption of the printer supply managed by the image forming device, and the remaining amount of the printer supply managed by the image forming device.

11. The image forming apparatus of claim 10, wherein the image forming device is further configured to display the supply status information in the updated supply information list to reflect the change to at least the near end state or the end state in supply status information caused by updating, wherein the supply information includes supply status information indicating a current status of the printer supply, the current status including at least a near end state and an end state.

12. The image forming apparatus of claim 11, wherein the print settings information determines at least one of the appearance of the supply information list having the supply information, and the contents or types of the supply information to be included in the supply information list.

13. A method of managing a supply of an image forming device provided in an image forming apparatus, the method comprising:

storing supply information of the supply of the image forming device and print settings information regarding a supply information list, the print settings information previously set and changeable by a user for the supply of the image forming device;

generating the supply information list including the supply information being stored according to the print settings information being stored;

printing the supply information list on a recording sheet;

obtaining updated supply information when the supply information being stored is updated;

converting the updated supply information into a form determined by the print settings information to generate an updated supply information list; and printing the updated supply information list on a recording sheet to reflect the change in supply information.

14. The method of claim 13, further comprising:

determining whether an image forming job is being currently performed by the image forming device to generate a determination result; and interrupting the image forming job being currently performed until the supply information list is printed when the determination result indicates that the image forming job is being currently performed.

15. The method of claim 14, further comprising:

selecting a position or location at which the recording sheet having the supply information list is discharged.

16. The method of claim 14, further comprising:

authenticating a user to generate an authentication result using information input by the user, wherein the image forming job being currently performed is interrupted when the authentication result indicates that the user has access to the supply information.

17. The method of claim 16, further comprising:

connecting the image forming apparatus with an alternate image forming apparatus via a network when the authentication result further indicates that the user is allowed to perform alternate printing, wherein the supply information list is printed by the alternate image forming apparatus.

18. The method of claim 13, further comprising displaying the supply amount information in the updated supply information list to reflect a step-by-step change in supply amount information caused by updating, wherein the supply information includes, supply amount information that indicates at least one of the degree of usage of the image forming device, the remaining life time of the image forming device, the amount of consumption of the printer supply managed by the image forming device, and the remaining amount of the printer supply managed by the image forming device.

19. The method of claim 18, wherein the supply information includes supply status information indicating a current status of the printer supply, the current status including at least a near end state and an end state, and the method further comprising;

displaying the supply status information in the updated supply information list to reflect the change to at least the near end state or the end state in supply status information caused by updating.

20. A system for managing supply information, the system comprising:

a first image forming apparatus including a first detector configured to detect first supply information of a first supply provided in the first image forming apparatus;

a second image forming apparatus including a second detector configured to detect second supply information of a second supply provided in the second image forming apparatus; and a supply information manager connected to the first image forming apparatus and the second image forming apparatus via a network and configured to store the first supply information and the second supply information, generate a supply information list including the first supply information and the second supply information according to print settings information regarding the supply information list, the print settings information being changeable according to user preference, and print the supply information list on a recording sheet using at least one of the first image forming apparatus and the second image forming apparatus, wherein when one of the first detector and the second detector detects a change in the corresponding one of the first supply information and the second supply information, the supply information manager further updates detected one of the first supply information and the second supply information being stored, generates an updated supply information list including the updated one of the first supply information and the second supply information, and prints the updated supply information list on a recording sheet to reflect the change in the updated one of the first supply information and the second supply information that is caused by updating.

* * * * *